US012800847B2

(12) United States Patent
Higley et al.

(10) Patent No.: US 12,800,847 B2
(45) Date of Patent: Nov. 17, 2026

(54) ADAPTER SHUTTER ASSEMBLY WITH SHUTTER RETENTION CAP

(71) Applicant: US Conec Ltd., Hickory, NC (US)

(72) Inventors: Jason Higley, Hickory, NC (US); Craig M. Conrad, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 234 days.

(21) Appl. No.: 18/415,963

(22) Filed: Jan. 18, 2024

(65) Prior Publication Data

US 2024/0151912 A1 May 9, 2024

Related U.S. Application Data

(63) Continuation-in-part of application No. 18/547,206, filed as application No. PCT/US2022/020259 on Mar. 14, 2022.

(60) Provisional application No. 63/161,788, filed on Mar. 16, 2021, provisional application No. 63/439,672, filed on Jan. 18, 2023.

(51) Int. Cl.
*G02B 6/38* (2006.01)

(52) U.S. Cl.
CPC ......... *G02B 6/3825* (2013.01); *G02B 6/3849* (2013.01); *G02B 6/387* (2013.01); *G02B 6/3885* (2013.01); *G02B 6/3821* (2013.01); *G02B 6/3831* (2013.01); *G02B 6/3851* (2013.01)

(58) Field of Classification Search
CPC .. G02B 6/3821; G02B 6/3825; G02B 6/3831; G02B 6/3849; G02B 6/3851; G02B 6/387; G02B 6/3885
See application file for complete search history.

(56) References Cited

U.S. PATENT DOCUMENTS

| | | | | |
|---|---|---|---|---|
| 6,240,229 | B1 | 5/2001 | Roth | |
| 6,471,412 | B1 | 10/2002 | Belenkiy et al. | |
| 6,866,424 | B2 * | 3/2005 | Tanaka | G02B 6/3825 385/55 |
| 9,453,963 | B2 | 9/2016 | Sato | |
| 9,933,586 | B1 * | 4/2018 | Yang | G02B 6/3825 |
| 10,101,539 | B2 * | 10/2018 | Yang | G02B 6/3849 |
| 10,545,295 | B1 * | 1/2020 | Sato | G02B 6/3825 |
| 10,802,224 | B2 * | 10/2020 | Wong | G02B 6/3893 |
| 11,237,339 | B2 | 2/2022 | Nguyen et al. | |

(Continued)

FOREIGN PATENT DOCUMENTS

| | | | | |
|---|---|---|---|---|
| EP | 1122565 | A1 | 8/2001 | |
| WO | WO-2020057528 | A1 * | 3/2020 | G02B 6/3825 |

(Continued)

OTHER PUBLICATIONS

Machine translation of WO 2020/057528 A1. (Year: 2020).*

*Primary Examiner* — Ryan A Lepisto
(74) *Attorney, Agent, or Firm* — Michael L. Leetzow PLLC

(57) ABSTRACT

A fiber optic adapter assembly includes an adapter body, a spring clip and a retention cap attached to the adapter body enclosing each of the spring clip and two shutters. The adapter body has a main opening and two pivot walls with latch arms extending away from the main opening, the pivot walls being solid between a top edge and a bottom edge. The spring clip has a plurality of fingers moveably contacting each of shutters, which pivot between a first and second position.

18 Claims, 39 Drawing Sheets

(56) References Cited

U.S. PATENT DOCUMENTS

| | | | | |
|---|---|---|---|---|
| 11,262,510 | B2 | 3/2022 | Wong et al. | |
| 2021/0349268 | A1 | 11/2021 | Lei et al. | |
| 2022/0011520 | A1 * | 1/2022 | Sato | G02B 6/381 |
| 2022/0197638 | A1 | 6/2022 | Lemay | |

FOREIGN PATENT DOCUMENTS

| | | | |
|---|---|---|---|
| WO | 2021021575 | A1 | 2/2021 |
| WO | 2022197638 | A1 | 9/2022 |

* cited by examiner

ADAPTER SHUTTER ASSEMBLY WITH SHUTTER RETENTION CAP

REFERENCE TO RELATED CASE

This application claims priority under 35 U.S.C. § 119 (e) to U.S. provisional application No. 63/439,672 filed on Jan. 18, 2023, and under 35 U.S.C. § 120 to U.S. patent application Ser. No. 18/547,206 as a continuation-in-part, the contents of which are hereby incorporated by reference in their entirety.

BACKGROUND OF THE INVENTION

The fiber optic connector industry utilizes adapters for mating fiber optic connectors to form an optical connection. Often, these adapters have shutters on each end for eye safety and/or dust and debris reduction. The shutters close off the mating space inside the adapter and can be opened (automatically or manually) when the connectors are being inserted. One such MPO adapter with a shutter is presented in US Patent Pub. No. 2021/0349268 (hereinafter "the '268 publication") to Suncall Technologies (SZ) Co., Ltd. of Shenzhen, China.

While capable of helping with dust, these adapters are still prone to dust and are not dust-proof in their true sense—for example, dust can still enter from the sides of the adapter. As an example, the adapter shown in the '268 publication has a gap between the extension posts 11 and the engagement arm 12. This gap is filled in when the adapter body 3 is joined to the second adapter body 1 when the posts 11 go into a groove inside the adapter body 3. However, even with such an engagement, once assembled, there is still a good chance that fine dust and debris can penetrate inside the adapter assembly.

Another MPO adapter with shutters and a shutter retention cap is discussed below and also within Applicant's WIPO Publication No. WO 2022/197638 (U.S. patent application Ser. No. 18/547,206, hereinafter "the '638 publication").

Such adapters need to withstand substantial vertical forces when populated with fiber optic connectors. To meet the industry requirements, proof-load tests are carried out to qualify the designs for such adapters. There are situations when such adapters with two pieces have one of the pieces come off due to forces from the fiber optic connectors. Current MPO adapters have a room for improvement when it comes to a better securing of the MPO connectors therein to better qualify them for proof-load testing. Typical adapters with shutters also have an issue of pin stubbing when a male MPO connector with guide pins is being inserted into the adapter. Such pin stubbing could cause damage to the fiber-optic ferrule, the adapter or both. Further, light can still escape from in-between the adapter features raising an eye safety concern.

SUMMARY OF THE INVENTION

According to one aspect, the present invention is directed to an adapter body having a main opening to receive at least one fiber optic connector, the main opening surrounded circumferentially by a top side, a bottom side, a first side and a second side between the top side and the bottom side, the first side and the second side on opposing sides of the main opening, the adapter body further includes a first pivot wall adjacent the first side and extending longitudinally away from a forward facing surface around the main opening, the first pivot wall being solid between a top edge and a bottom edge, wherein the first pivot wall includes a pair of pivot surfaces to respectively receive a first shutter adjacent the top edge and a second shutter adjacent the bottom edge, a second pivot wall adjacent the second side and extending longitudinally away from the forward facing surface around the main opening, the second pivot wall being solid between a top edge and a bottom edge, wherein the second pivot wall includes a pair of pivot surfaces to respectively receive the first shutter adjacent the top edge and the second shutter adjacent the bottom edge, a first latch arm extending longitudinally away from the first pivot wall and away from the main opening, the first latch arm configured to engage a mating fiber optic connector, a second latch arm extending longitudinally away from the second pivot wall and away from the main opening, the second latch arm also configured to engage the mating fiber optic connector, wherein the first pivot wall and the second pivot wall are each positioned between the main opening and the respective first latch arm and the second latch arm in a longitudinal direction, and a retention cap attached to the adapter body enclosing the first pivot wall, the second pivot wall, the first latch arm, the second latch arm, the first adapter shutter and the second adapter shutter, wherein the first shutter and the second shutter pivot at least partially within the retention cap and at least partially at the respective pivot ends of the respective pivot walls.

In some embodiments, when the first shutter and the second shutter are in a closed position and engaged to each other, the first latch arm and the second latch arm are positioned fully forward of the first shutter and the second shutter.

In some embodiments, the first pivot wall and the second pivot wall are each positioned between the main opening and the respective first latch arm and the second latch arm in a longitudinal direction.

In some embodiments, the retention cap has projections to engage the first shutter at the first and third pivot surfaces and the second shutter at the second and fourth pivot surfaces.

In some embodiments, the retention cap has openings to receive posts on the adapter body to secure the retention cap to the adapter body In some embodiments, the first and second shutters have an outwardly extending bump to engage an inner housing of the fiber optic connector to orient the fiber optic connector within the fiber optic adapter assembly.

In yet another aspect, there is a two-piece fiber optic adapter assembly that includes an adapter body having a main opening to receive at least one fiber optic connector, the main opening surrounded circumferentially by a top side, a bottom side, a first side and a second side between the top side and the bottom side, the first side being opposite the second side, the adapter body that further includes a first pivot wall adjacent the first side and extending longitudinally away from the main opening, the first pivot wall being solid between a top edge and a bottom edge, wherein the first pivot wall includes a first pivot surface adjacent the top edge and a second pivot surface adjacent the bottom edge, a second pivot wall adjacent the second side and extending longitudinally away from the main opening, the second pivot wall being solid between a top edge and a bottom edge, wherein the second pivot wall pivot wall includes a third pivot surface adjacent the top edge and a fourth pivot surface adjacent the bottom edge, a first latch arm extending longitudinally away from the first pivot wall and away from the main opening, the first latch arm configured to engage a mating fiber optic connector, a second latch arm extending longitudinally away from the second pivot wall and away from the main opening, the second latch arm also configured to engage the mating fiber optic connector, wherein the first pivot wall and the second pivot wall are each positioned between the main opening and the respective first latch arm and the second latch arm in a longitudinal direction; and a first shutter positioned on the first pivot surface adjacent the top edge of the first pivot wall and on the third pivot surface adjacent the top edge of the second pivot wall; a second shutter positioned on the second pivot surface adjacent the bottom edge of the first pivot wall and the fourth pivot surface adjacent the bottom edge of the second pivot wall, each of the first shutter and the second shutter moveable between an open position and a closed position, a retention cap attached to the adapter body enclosing each of the spring clip, the first shutter and the second shutter, wherein the first shutter and the second shutter pivot at least partially within the retention cap and at least partially at the respective pivot arms in the first and second pairs of pivot arms.

In some embodiments, the first pivot wall and the second pivot wall are each positioned between the main opening and the respective first latch arm and the second latch arm in a longitudinal direction.

In some embodiments, there is a spring clip positioned around a portion of the adapter body, the spring clip including a plurality of fingers moveably contacting each of the first shutter and the second shutter.

In some embodiments, the retention cap has openings to receive posts on the adapter body to secure the retention cap to the adapter body.

In some embodiments, the first and second shutters have an outwardly extending bump to engage an inner housing of the fiber optic connector to orient the fiber optic connector within the fiber optic adapter assembly.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
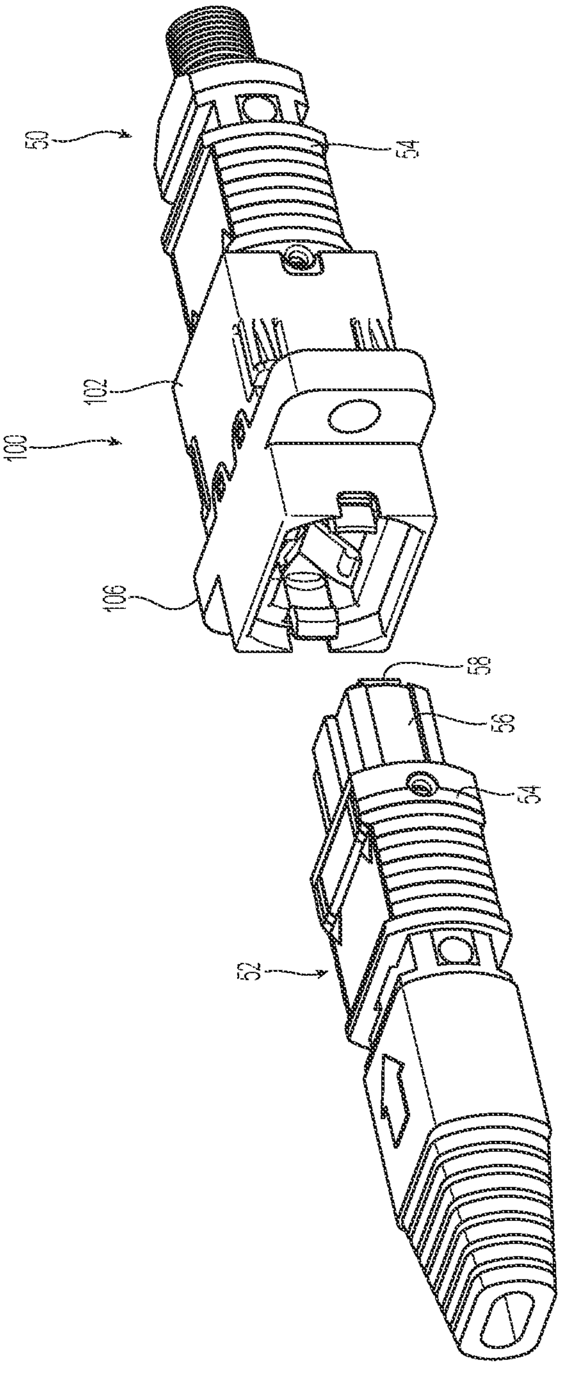
FIG. 1 is a perspective view of one embodiment of an adapter assembly according to the present invention with two MPO fiber optic connectors.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
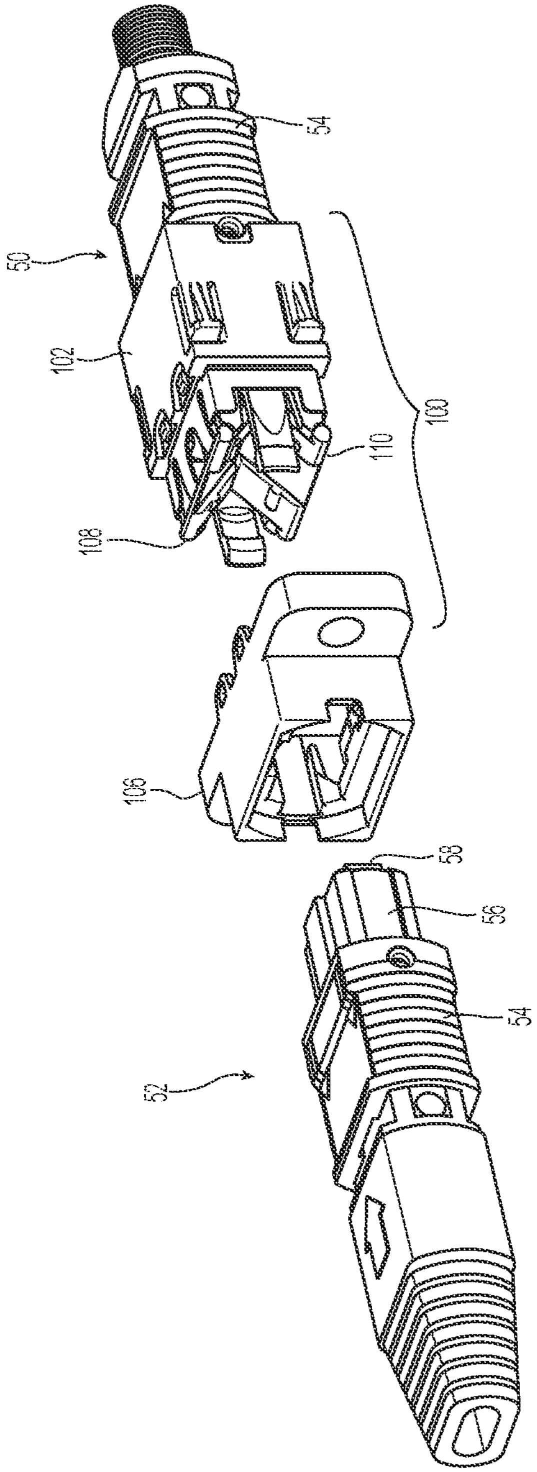
FIG. 2 is a partially exploded perspective view the adapter assembly and two MPO fiber optic connectors in FIG. 1.
Figure 3:
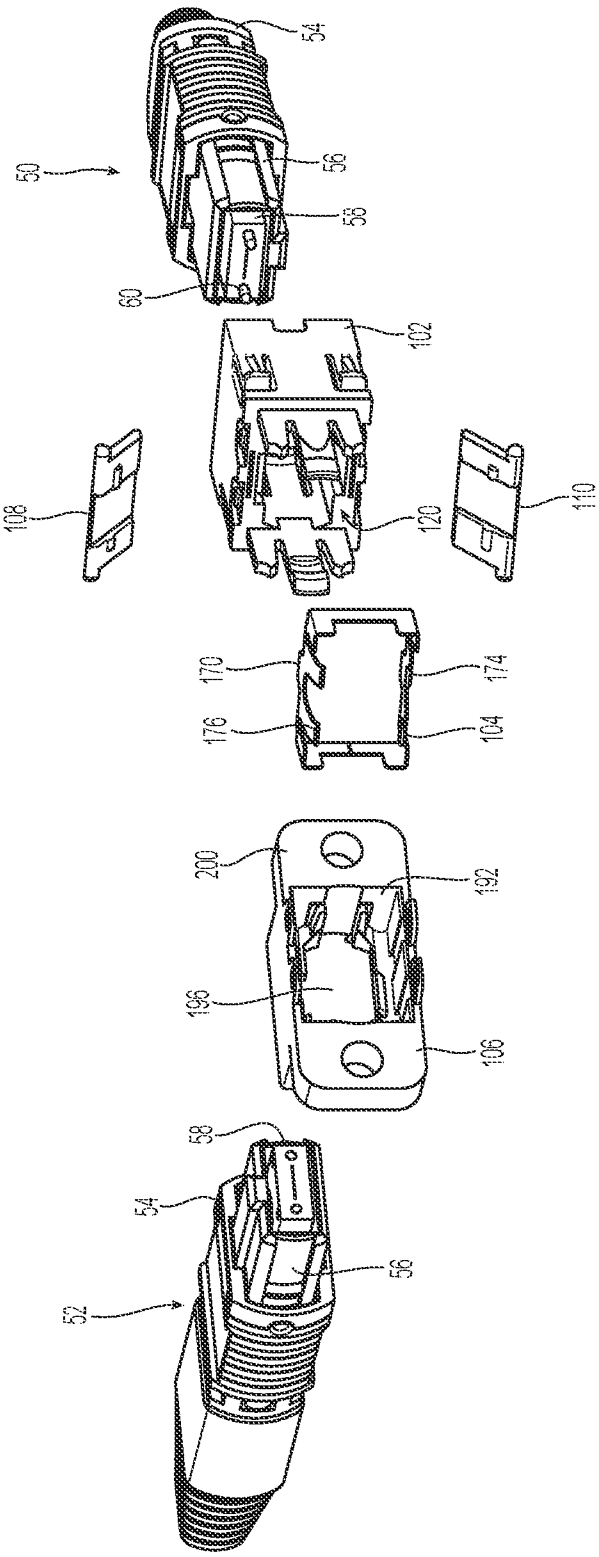
FIG. 3 is an exploded view of the adapter assembly of FIG. 1.
Figure 4:
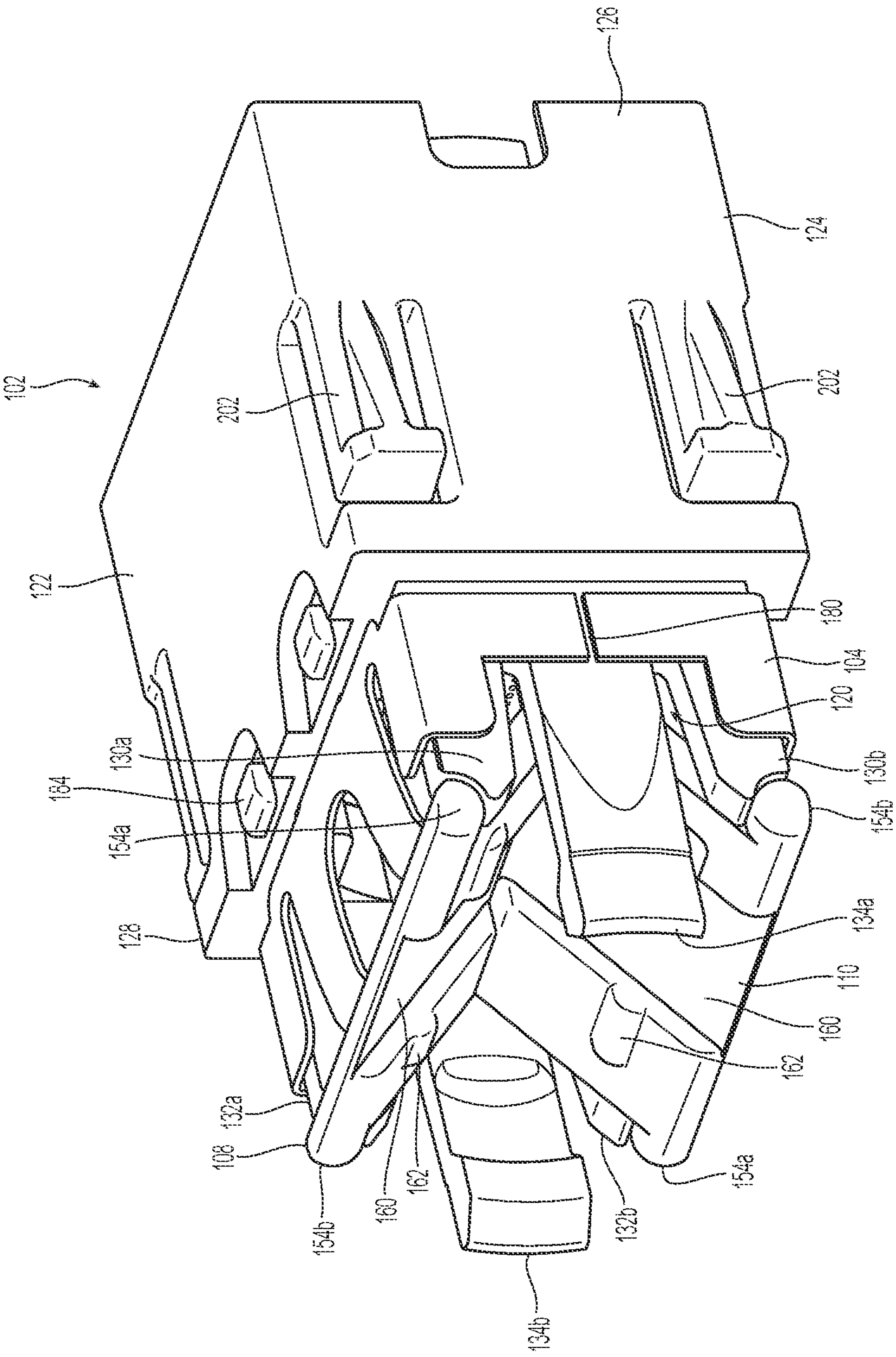
FIG. 4 is an enlarged perspective view of a portion of the adapter assembly in FIG. 1 with shutters disposed therein.
Figure 5A:
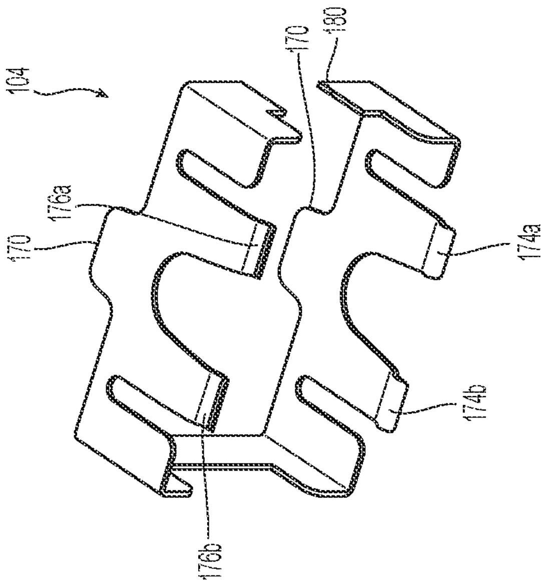
FIG. 5A is a perspective view of a spring clip in the adapter assembly in FIG. 1.
Figure 5C:
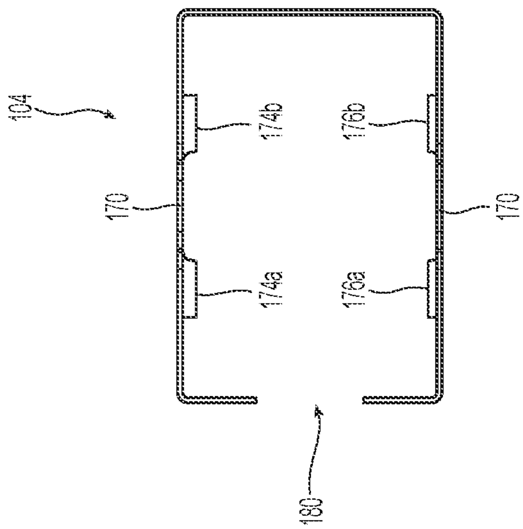
FIG. 5C is a front elevation view of the spring clip in FIG. 5A.
Figure 5B:
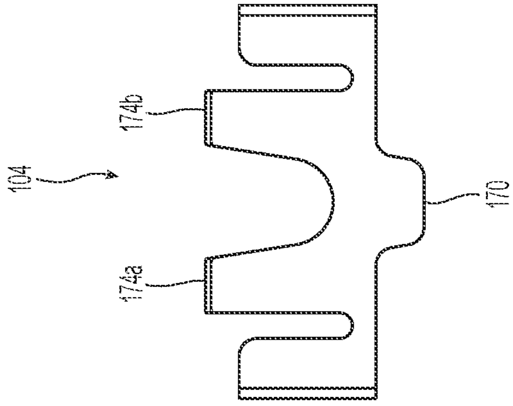
FIG. 5B is a top plan view of a spring clip in the adapter assembly in FIG. 1.

Illustrated in FIGS. 1-3 is one embodiment of a fiber optic adapter assembly 100 according to the present invention. This embodiment of the fiber optic adapter assembly 100 may be used with two fiber optic connectors 50 and 52, one having a male configuration 50 and the other having a female configuration 52. See FIG. 3. The fiber optic connectors 50,52 can be inserted from either side of the fiber optic adapter assembly 100. The fiber optic connectors 50,52 have an outer housing 54, an inner housing 56, a multi-fiber fiber optic ferrule 58 and, depending on the configuration of the fiber optic connector, guide pins 60. As illustrated herein, the fiber optic adapter assembly 100 preferably includes an adapter body 102, a spring element or spring clip 104 and a retention cap 106. The fiber optic adapter assembly 100 also includes two shutters 108,110 that are disposed within the fiber optic adapter assembly 100. See FIGS. 2-4 and 8-10.

The adapter body 102 of the fiber optic adapter assembly 100 has a main opening 120 to receive at least one of the fiber optic connectors 50, 52 from each side of the fiber optic adapter assembly 100. The main opening 120 of the adapter body 102 is circumferentially surrounded by a top side 122, a bottom side 124, a first side surface 126 and a second side surface 128. The first side surface 126 and the second side surface 128 function to separate the top side 122 from the bottom side 124 and are on opposing sides of the main opening 120.

Applicant notes that the term "front" or "forward" means that direction where the fiber optic ferrule would be inserted into the fiber optic adapter assembly 100 in the perspective of using the adapter assembly 102. Therefore, in FIGS. 1-3, the front is to the left side of the fiber optic adapter assembly 100 as the right side is typically installed within a panel or other receptacle, and therefore being in the rear or behind the panel.

Figure 6:
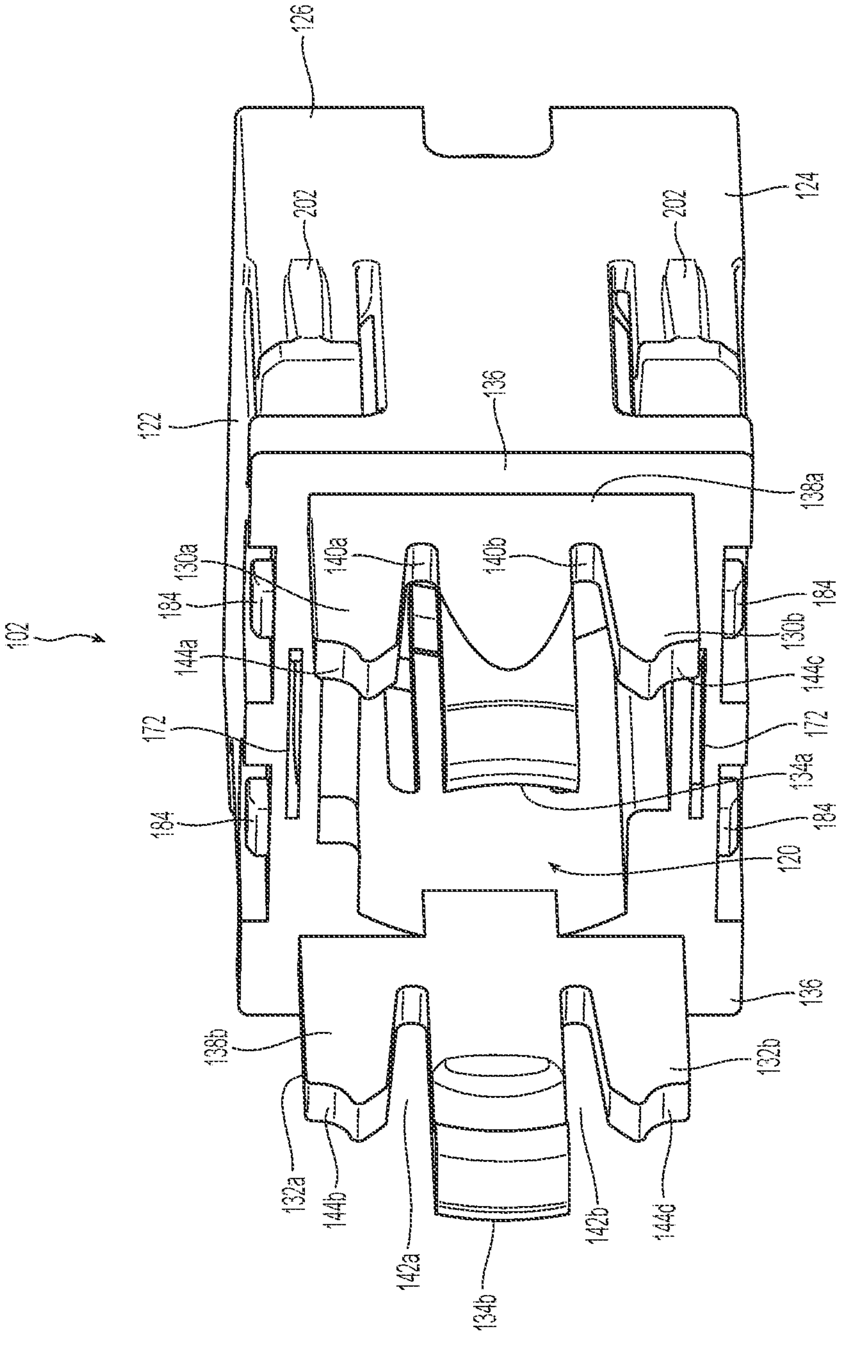
FIG. 6 is a front perspective view of the adapter body of the adapter assembly in FIG. 1.
Figure 7:
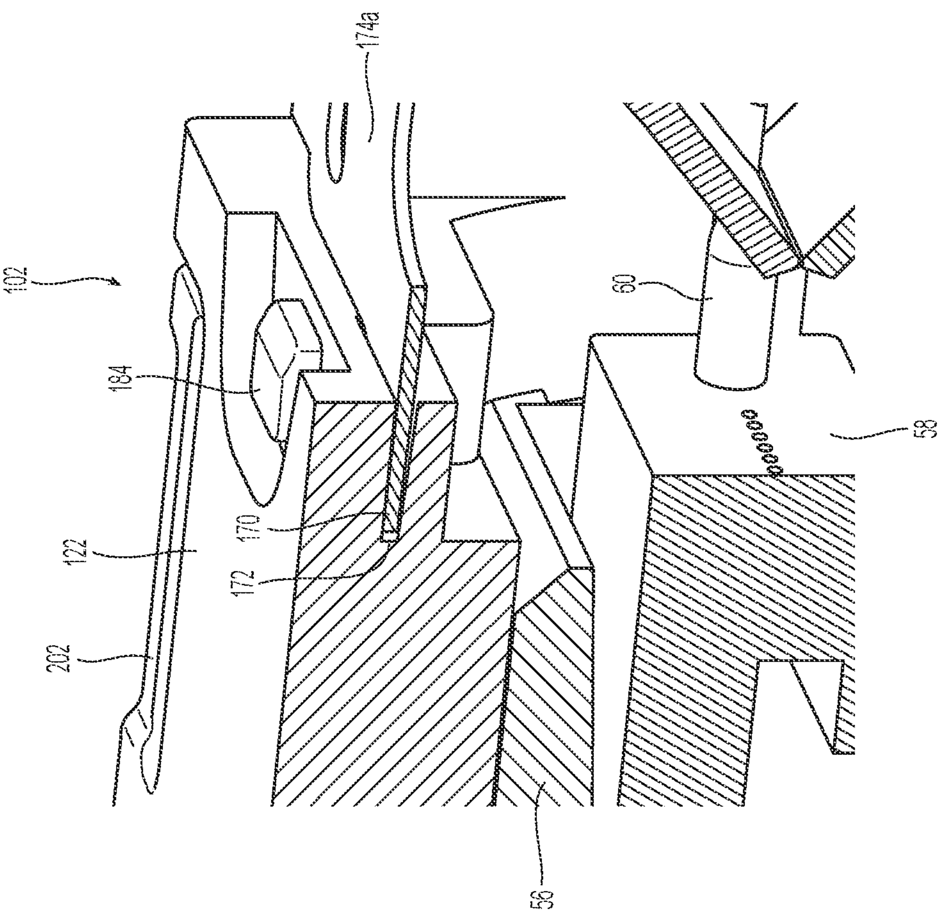
FIG. 7 is a partial cross sectional view of the adapter body and spring clip of the adapter assembly.

The adapter body 102 of the fiber optic adapter assembly 100 has two pair of pivot arms, a first pair of pivot arms 130*a*,130*b* are adjacent the first side surface 126 and extend away from the main opening 120 and toward the front of the adapter body 102 of the fiber optic adapter assembly 100. The second pair of pivot arms 132*a*, 132*b* are adjacent the second side surface 128 and also extend away from the main opening 120 and toward the front of the adapter body 102 of the fiber optic adapter assembly 100. Disposed between each of the pair of pivot arms is a connector latch arm, a first latch arm 134*a* is disposed between first pair of pivot arms 130*a*,130*b* and the second latch arm 134*b* is disposed between the second pair of pivot arms 132*a*, 132*b*. The first latch arm 134*a* and the first pair of pivot arms 130*a*,130*b* extend away from the adapter body 102 and the main opening 120 via a common attachment member 138*a* that extends from a front facing surface 136 of the adapter body 102 that surrounds the main opening 120. See, e.g., FIG. 6. The second latch arm 134*b* and the second pair of pivot arms 132*a*, 132*b* extend away from the adapter body 102 and the main opening 120 via a common attachment member 138*b* that extends from the front facing surface 136 of the adapter body 102 that surrounds the main opening 120. However, the two latch arms 134*a*,134*b* and the pivots arms 130*a*, 130*b*,132*a*,132*b* could each extend directly from the front facing surface 136 independently of one another. See FIGS. 2, 3, and 6. It should therefore be recognized that there is a gap between each of the latch arms and their respective pivot arms. See FIGS. 4, 6, 8, and 11. Specifically, there is a gap 140*a* between the first latch arm 134*a* and one of first pair of pivot arms 130*a*, and a second gap 140*b* between the first latch arm 134*a* and the second of the first pair of pivot arms 130*b*. Likewise, gap 142*a* is between the second latch arm 134*b* and one of second pair of pivot arms 132*a*, and a second gap 142*b* between the second latch arm 134*b* and the second of the second pair of pivot arms 132*b*. As discussed below, the gaps 140*a*,140*b*,142*a*,142*b* are sealed by structures that are within the retention cap 106 to prevent dust and debris from entering the main opening 120. The gaps 140*a*,140*b*,142*a*,142*b* extend behind the shutters 108,110 when in the fully closed position of the shutters 108,110.

Each of the pivot arms 130*a*,130*b*,132*a*,132*b* have at a distal end thereof (that is at the free end of the pivot arm) a pivot end 144*a*,144*b*,144*c*,144*d*, respectively. The pivot ends 144*a*,144*b*,144*c*,144*d* are arcuate/curved/semi-circular in configuration. A portion of each of the shutters 108,110 are disposed within the pivot arms. This allows for rotation of the two shutters 108,110 within those pivot ends as discussed below. However, in an alternative embodiment, the pivot ends 144*a*,144*b*,144*c*,144*d* may be formed by two planar surfaces instead of the curved surface shown in the figures, for example, to form a V-shaped or L-shaped structure, which a portion of the shutters 108,110 engages or rests upon.

Figure 8:
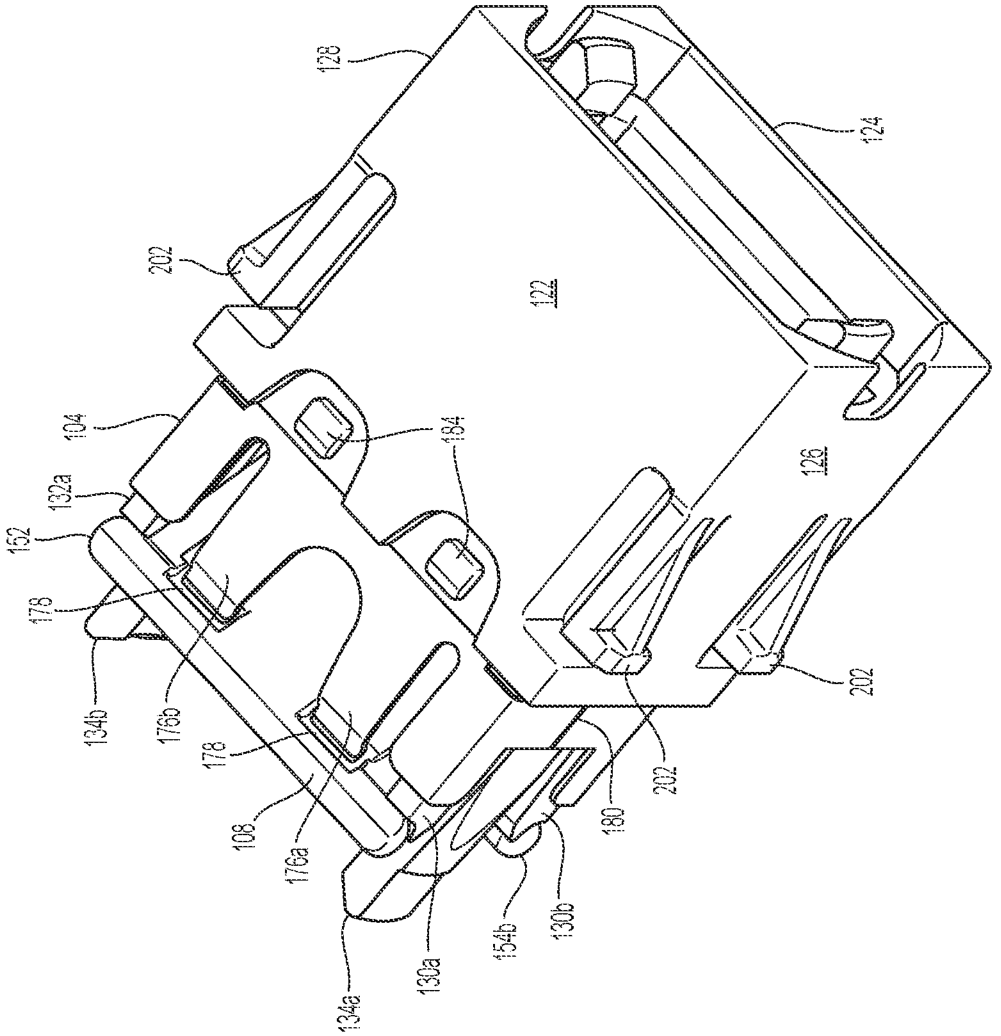
FIG. 8 is another perspective view of the adapter body, spring clip, and shutters of the adapter assembly in FIG. 1.
Figure 9:
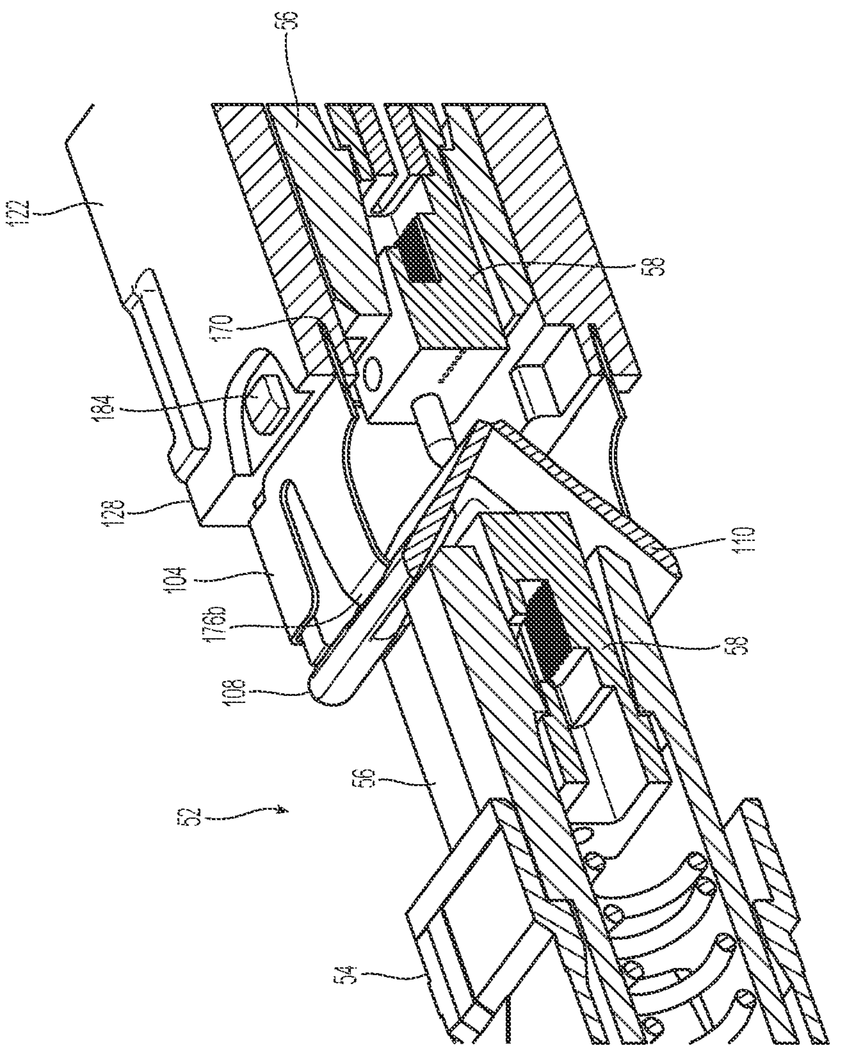
FIG. 9 is a perspective view of the adapter body, spring clip, and shutters of the adapter assembly in FIG. 1 without a retention cap.
Figure 10:
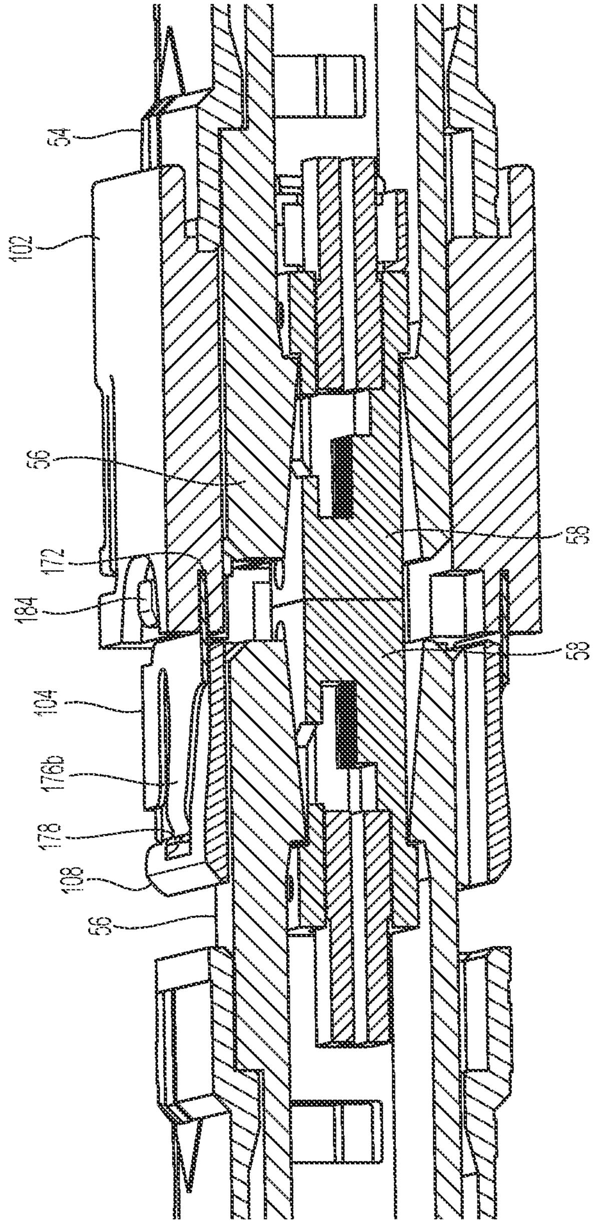
FIG. 10 is a cross section view of the adapter assembly in FIG. 9.
Figure 11:
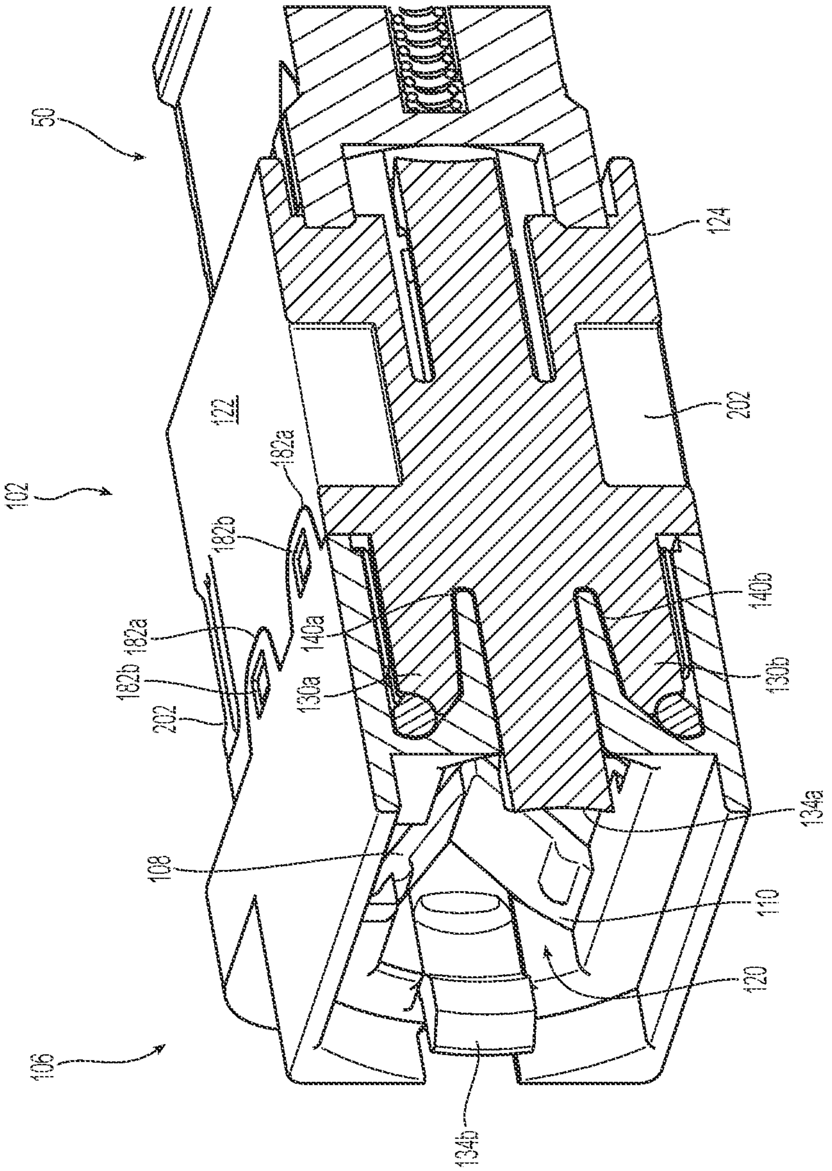
FIG. 11 is a cross section view of the adapter assembly in FIG. 1 and one MPO fiber optic connector inserted into the adapter body.
Figure 19:
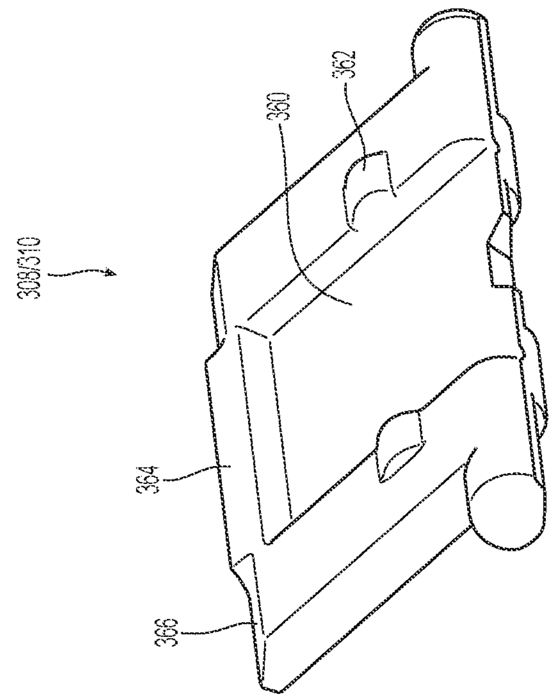
FIG. 19 is a perspective view of an alternative embodiment of a shutter used with the adapter assembly.
Figure 18:
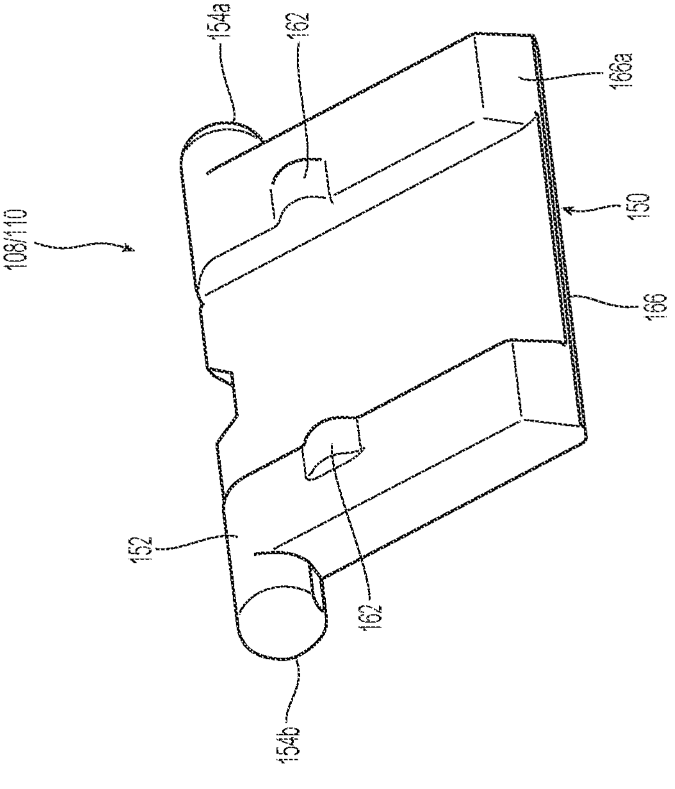
FIG. 18 is a perspective view of a shutter used with the adapter assembly.

As best seen in FIGS. 18,19, but also clearly visible in FIGS. 3, 4, 8, 16, 19, and 24, the two shutters 108,110 are generally planar and preferably have a central section 150 that is generally rectangular with at least one rounded edge 152 and two cylindrical projections 154*a*,154*b* extending outward from the central section 150 at the rounded edge 152 in a direction coaxial with the rounded edge 152 and orthogonal to the central section 150. Thus, the two cylindrical projections 154*a*,154*b* can be considered to be an extension of the at least one rounded edge 152. The two cylindrical projections 154*a*,154*b* are to be disposed on the pivot ends (e.g. 144*a*,144*b*,144*c*,144*d*) at least partially. As illustrated in FIG. 8, the two cylindrical projections 154*a*, 154*b* of shutter 108 are disposed on the pivot end 144*a* of pivot arm 130*a* and pivot end 144*c* of pivot arm 132*a*, while the two cylindrical projections 154*a*,154*b* of shutter 110 are disposed on the pivot end 144*b* of pivot arm 130*b* and pivot end 144*d* of pivot arm 132*b*. The shutters 108,110 are disposed within the pivot arms such that the shutters extend from the pivot arms back toward the main opening 120 of the adapter body 102.

Figure 21:
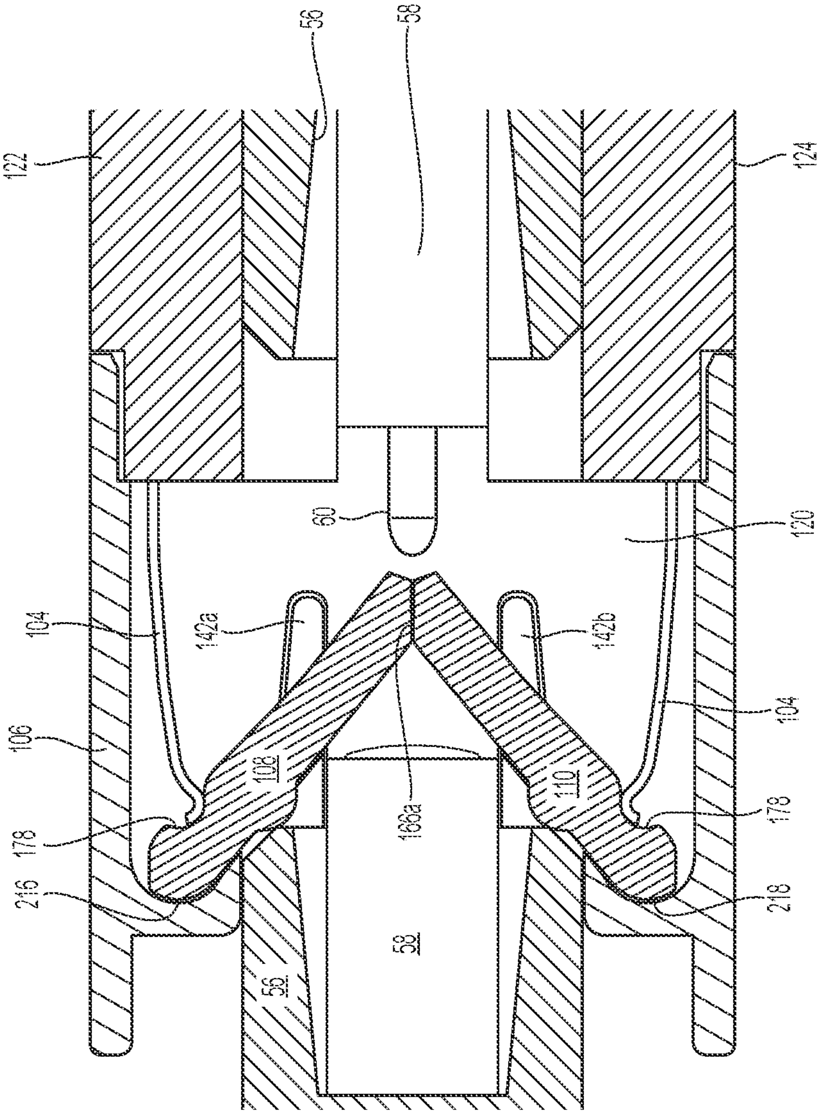
FIG. 21 is a cross sectional view at a mating position within the fiber optic adapter assembly as the female MPO fiber optic connector is inserted.
Figure 22:
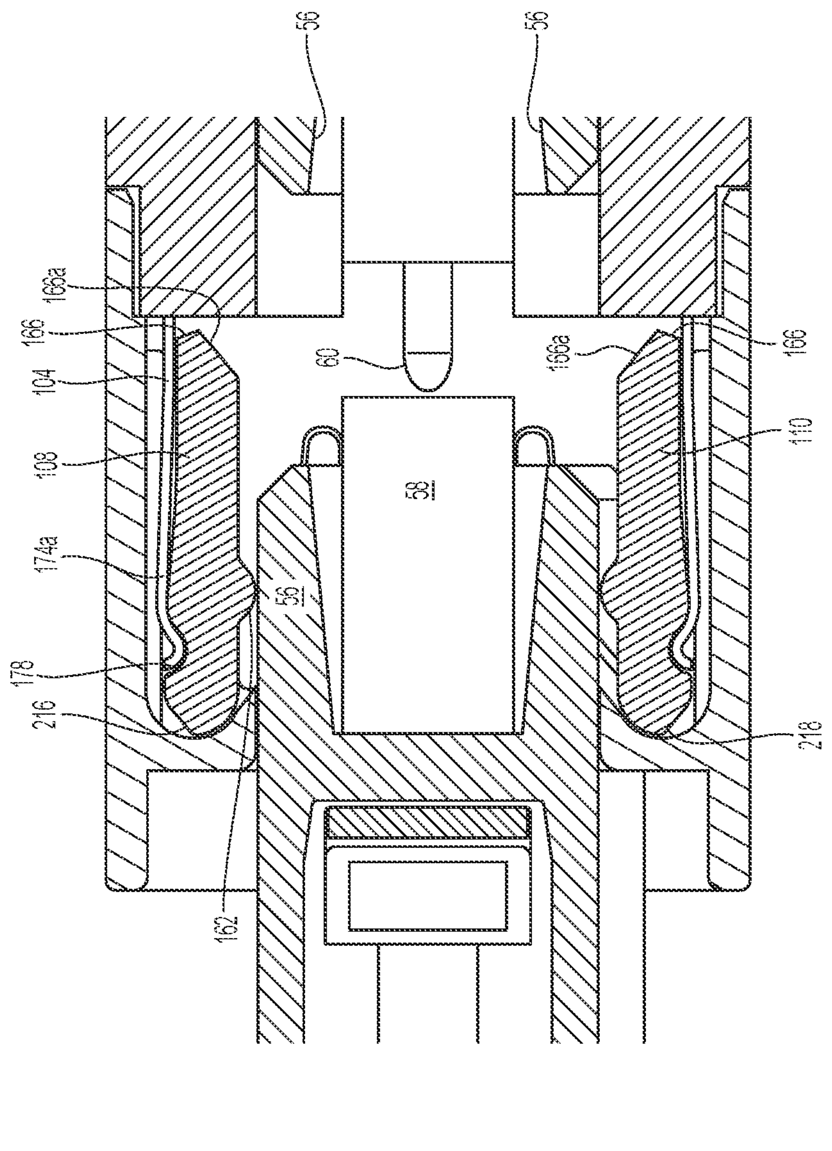
FIG. 22 is a cross sectional view at a mating position within the adapter assembly with the female MPO fiber optic connector fully inserted.
Figure 23:
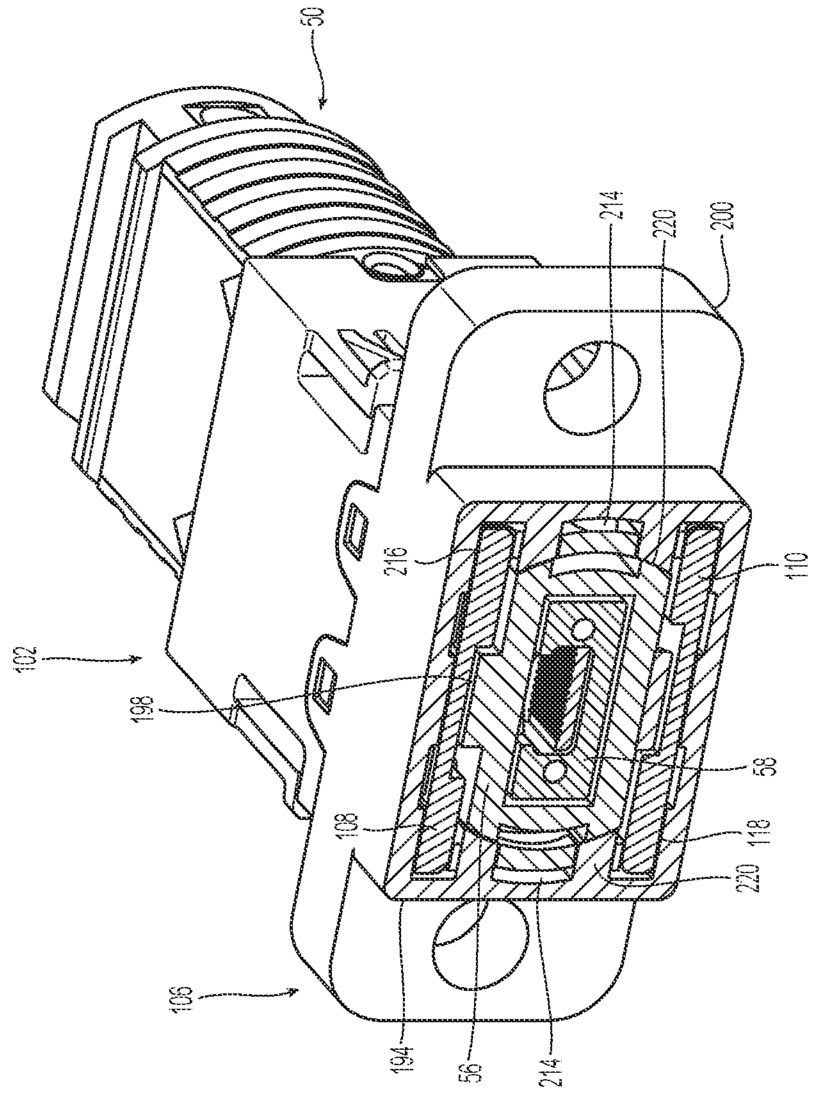
FIG. 23 is a cross sectional view through the retention cap, the fiber optic connector, and a portion of the shutters in the fiber optic adapter assembly.

On at least one side the shutters 108,110 is a groove 160 that corresponds to the size and shape of a multi-fiber fiber optic ferrule 58. See, e.g., FIG. 18. The groove 160 has a width that can accommodate differently positioned keys in different multi-fiber MPO connector types, e.g., from 8-16 fiber MPO connectors. For example, the key on the housing of a 16 fiber MPO connector is offset from a center of the housing, but the key for an 8 fiber MPO connector is centrally located on the housing (as is known in the art). Thus, the groove 160 could be in a different position of the shutters 108,110 for different fiber optic connectors. The shutters 108,110 may also have projections or outwardly extending bumps 162 that are positioned to engage the inner housing 56 as the fiber optic connector 50 is moved into the adapter assembly 100. See FIGS. 21 and 22. With the bumps 162 on both of the shutters 108,110, they also assist in maintaining the fiber optic connector 50 within the center of the main opening 120 so that it can more easily mate with the other fiber optic connector 52, as they are about to do in FIG. 22. Further, the bumps 162 prevent scratching of the end face of the multi-fiber ferrule 58, which does not contact the shutters 108,110. At a front edge 166 of the shutters 108,110 are flat surfaces 166*a* that configured to engage a corresponding surface of the other one of the shutters 108,110 when the fiber optic connector 50 is not inserted into the main opening 120. The front edge 166 is the distal end of the shutters 108,110. This engagement prevents the light from the fiber optic connector 52 from exiting out the front end of the adapter assembly 100.

Figure 20:
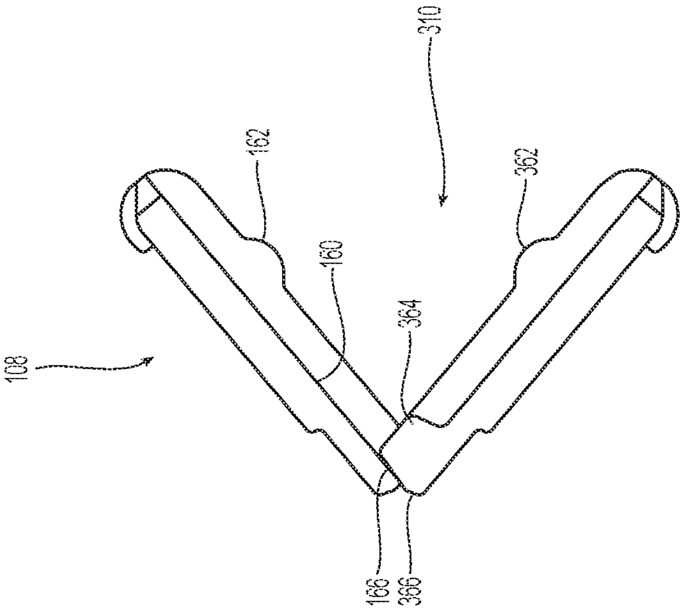
FIG. 20 is a side elevational view of the alternative embodiment of the shutter in FIG. 19 with a shutter from the fiber optic adapter assembly in FIG. 1.

In an alternative embodiment of a shutters 310, as illustrated in FIGS. 19 and 20, there is an insert or protrusion 364 in the groove 360 toward the front edge 366 of the shutter 310. The protrusion 364 may be on one of the other shutters as well. The protrusion 364 is configured to fit within the groove 160 of the other shutter 308 and assists in blocking the light from one of the fiber optic connectors 50,52, as the shutters are opening or closing. There may be a recess (not shown) provided for the protrusion 364 to engage on the other shutter. The addition of the protrusion 364 provides better eye protection. As seen in FIG. 20, the protrusion 364 extends to the front edge 366 of the shutter 310. As an alternative, it may extend beyond or short of the front edge 366. The shutter 310 may also include the projections or bumps 362.

The fiber optic adapter assembly 100 also includes a spring element or spring clip 104 that at least partially surrounds the adapter body 102 at the front end thereof. The spring element or spring clip 104 is designed to fit around the four pivot arms 130*a*,130*b*,132*a*,132*b* adjacent the front facing surface 136 and therefore has a generally rectangular shape as well. See, e.g., FIGS. 5A-5C, 8. The spring clip 104 preferably has two tabs 170 that extend rearwardly therefrom to engage the adapter body 102. See FIGS. 6, 7, 9, and 15. The tabs 170 are inserted into a tab receptacle 172 in the adapter body 102, preferably at the top side 122 and the bottom side 124 so as not to interfere with the latch arms 134*a*,134*b* and/or the pivot arms 130*a*,130*b*,132*a*,132*b*. This engagement of the spring clip 104 with the adapter body 102 provides the leverage needed to bias the shutters 108,110. There are also two sets 174,176 of two fingers 174*a*,174*b* and 176*a*,176*b* extending in a direction opposite the two tabs 170. The two sets fingers 174,176 each engage one of the shutters 108,110, which bias the shutters toward a closed position. See FIGS. 8, 9, and 10. There may be recesses 178 in the shutters 108,110 into which the two sets of fingers 174,176 are disposed. The recesses 178 in the shutters 108,110 would be on the opposite side of the shutters 108,110 from the projections or bumps 162 and the groove 160. While the spring clip 104 is illustrated as one piece, it could be multiple pieces or may be a single piece with a discontinuity 180 (a break) to allow for easier installation on the adapter body 102. See FIGS. 4 and 8. The two sets of fingers 174,176 do move relative to the shutters 108,110 during the movement of the shutters 108,110 as the fiber optic connectors 50,52 are inserted into and removed from the fiber optic adapter assembly 100. See FIGS. 21 and 22.

The fiber optic adapter assembly 100 includes a retention cap 106. See FIGS. 12-17. The retention cap 106 attaches to the front end of the adapter body 102. See FIGS. 15 and 16. Thus, the retention cap 106 encloses the two shutters 108, 110 and the spring clip 104 within the fiber optic adapter assembly 100. In one way to connect the spring clip 104 to the fiber optic adapter assembly 100, there are tabs 182*a* with openings 182*b* therein extending from two sides of the retention cap 106 to engage posts 184 on the top side 122 and the bottom side 124 of the adapter body 102. See FIGS. 12 and 14B. The posts 184 are preferably recessed into the top and bottom surfaces 122,124 although that is not a strict requirement. There may be more or fewer of the tabs and openings and posts, depending on the users' choices. As a result, the retention cap 106 is removably attached to the adapter body 102. Other methods of connecting the retention cap 106 to the adapter body 102 could be used as well, even if the components are not removable. Typically, once assembled, the retention cap 106 and the adapter body 102 stay together, and are not easily disassembled without the use of special tools.

Figure 25:
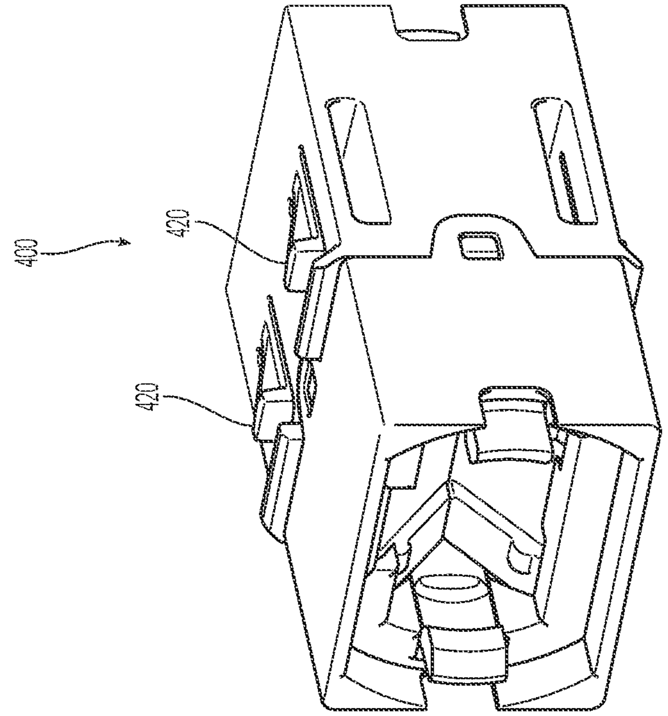
FIG. 25 is a perspective view of another embodiment of an adapter assembly according to the present invention.

The retention cap 106 has an inside surface 190 that defines an opening 192 and an outside surface 194. The fiber optic connector 50 is inserted into the fiber optic adapter assembly 100 through a cap opening 196 and is in communication with the opening 192. The cap opening 196 may have a key groove 198 to ensure that the fiber optic connector 50 is inserted into the fiber optic adapter assembly 100 in the correct orientation (keyed entry). See FIGS. 13 and 14A. The retention cap 106 may also include flanges 200 that extend outward from the outside surface 194. See FIGS. 1 and 14A. The flanges 200 are used to prevent the fiber optic adapter assembly 100 from being pushed through the openings in any panel into which the fiber optic adapter assembly 100 is inserted. The flanges 200 may also be smaller, shorter, or placed on a different side of the retention cap 106. It should be noted that there are also integral flanges 202 on the adapter body 102. The integral flanges 202 are not in communication with the main opening 120. See FIGS. 4, 6, and 8. These integral flanges 202 keep the fiber optic adapter assembly 100 from falling out the front a panel. As is known in the art, the fiber optic adapter assembly 100 is inserted into the opening of a panel with the adapter body 102 being inserted first. The fiber optic adapter assembly 100 is pushed into the panel until the flanges 200 engage the front of the panel. There is a space between the flanges 200 and the integral flanges 202 that corresponds to the thickness of the panel. The integral flanges 202 are discussed in detail in Applicant's pending application Ser. No. 17/669,758, the entire contents of which are incorporated herein by reference. While the integral flanges 202 are on the corners of the adapter body 102, they may also be on only the top side 122 and the bottom side 124. See, e.g., FIG. 25 where another embodiment of a fiber optic adapter assembly 400 is illustrated. In this embodiment, the integral flanges 420 are completely on one side, rather than at the junction of two sides in the above embodiment.

Figure 12:
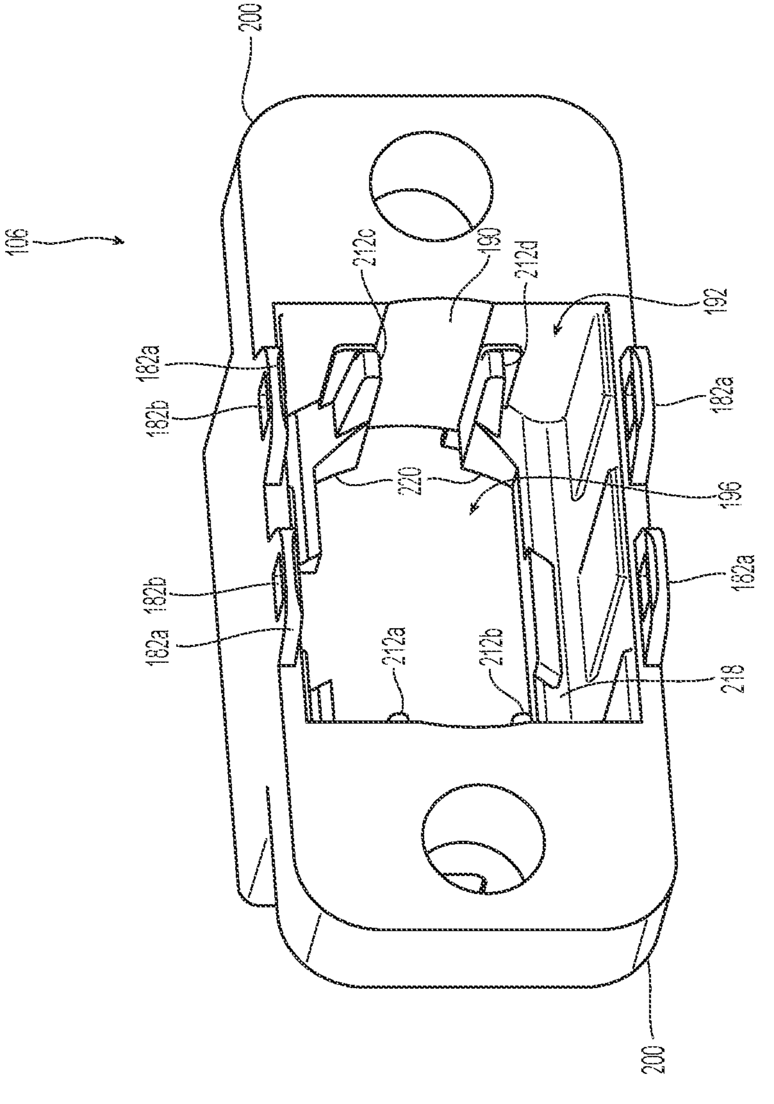
FIG. 12 is a perspective view from the rear of the retention cap in the adapter assembly in FIG. 1.
Figure 13:
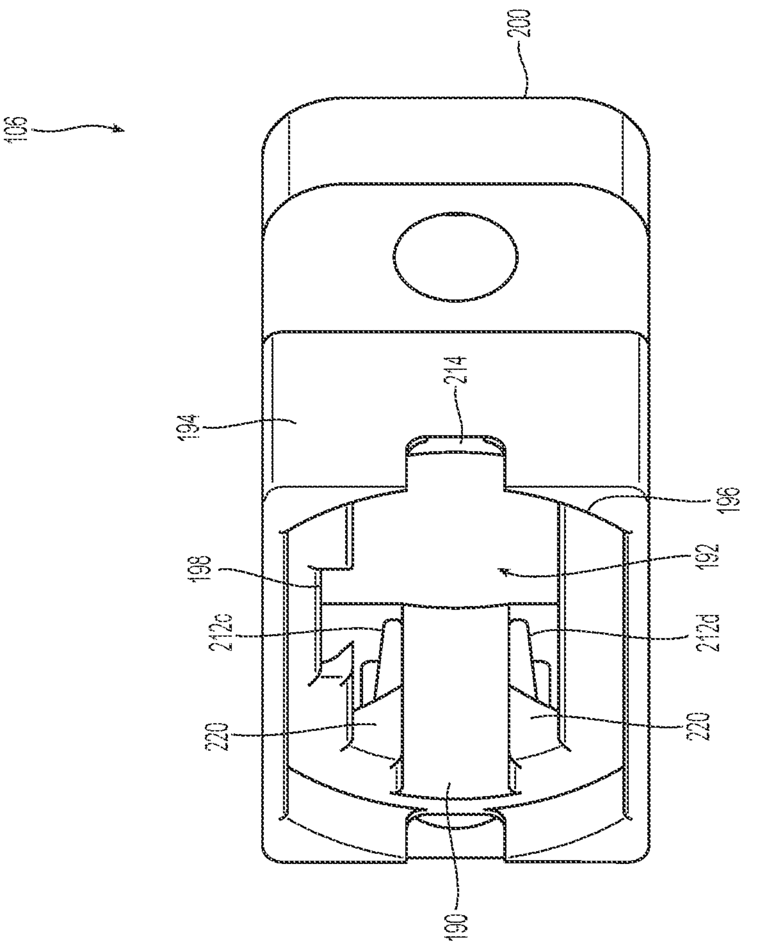
FIG. 13 is a perspective view from the front of the retention cap in the adapter assembly in FIG. 1.
Figure 14A:
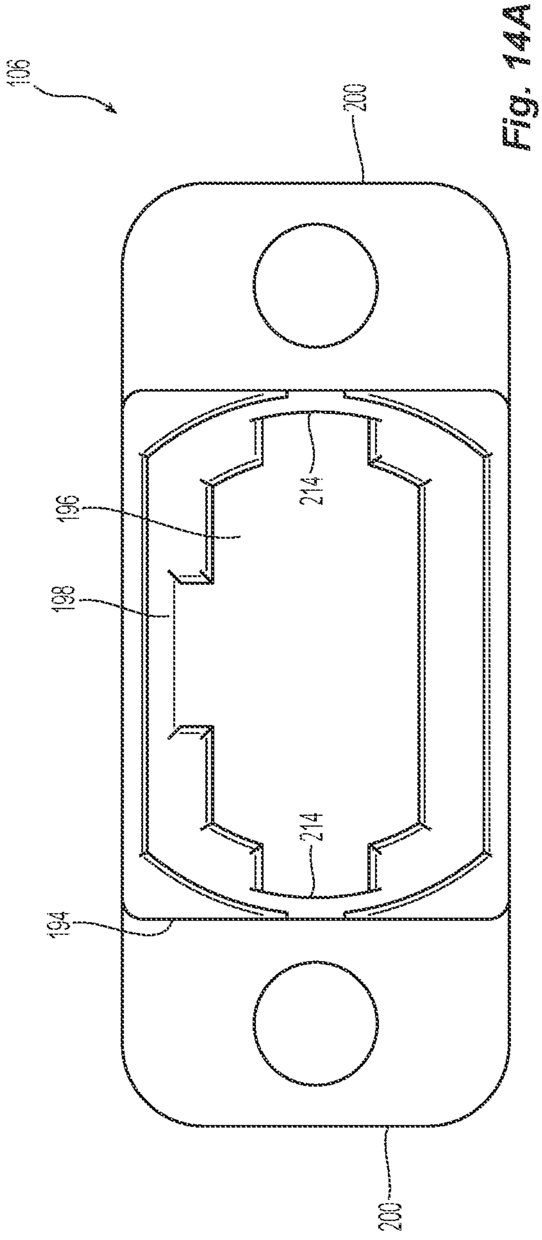
FIG. 14A is an elevational view from the front of the retention cap in the adapter assembly in FIG. 1.
Figure 14B:
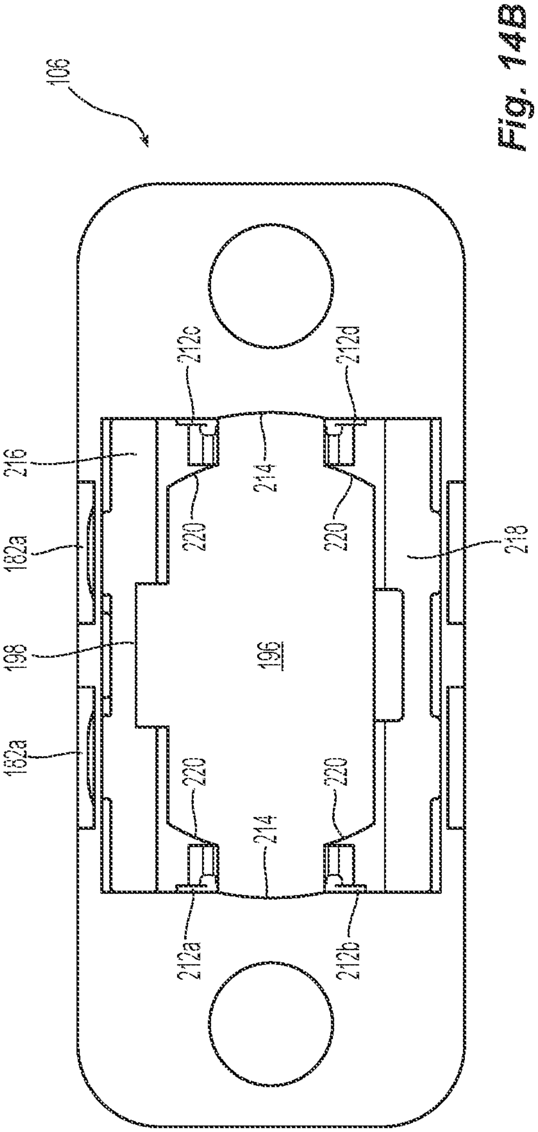
FIG. 14B is an elevational view from the front of the retention cap in the adapter assembly in FIG. 1.
Figure 15:
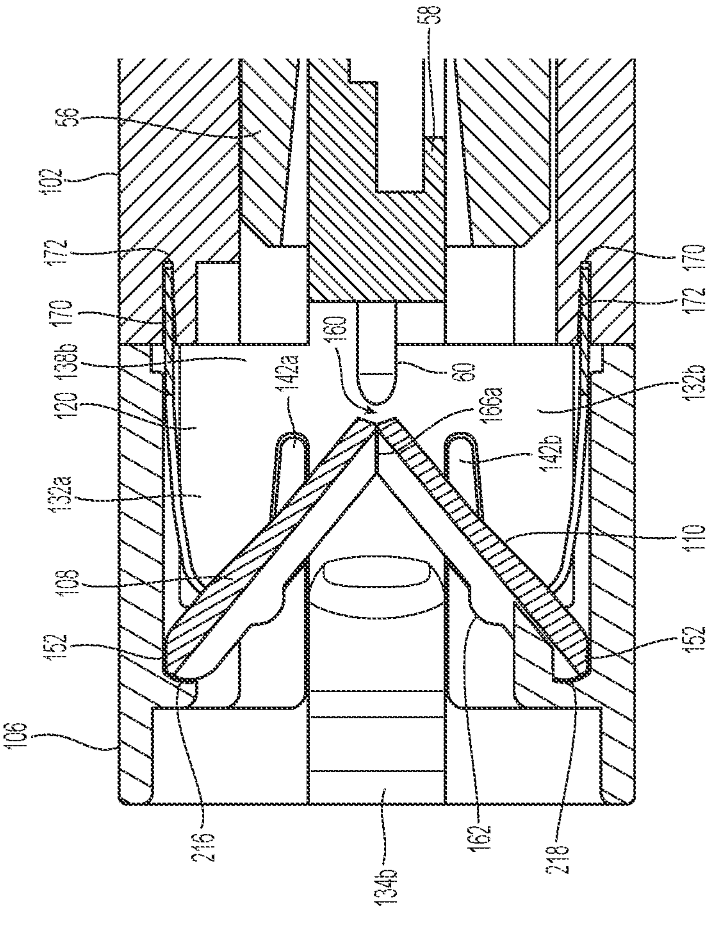
FIG. 15 is a cross sectional view from the side showing the shutters in engagement.
Figure 16:
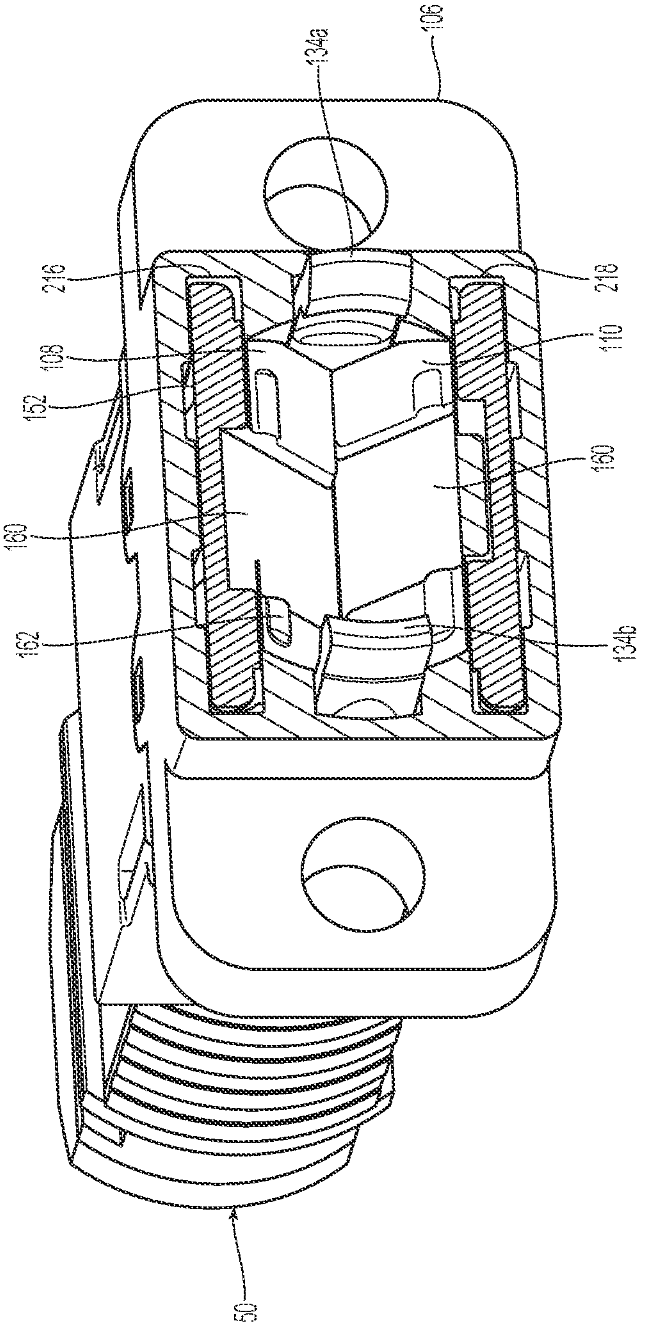
FIG. 16 is a cross sectional view through the retention cap and a portion of the shutters in the adapter assembly.
Figure 17:
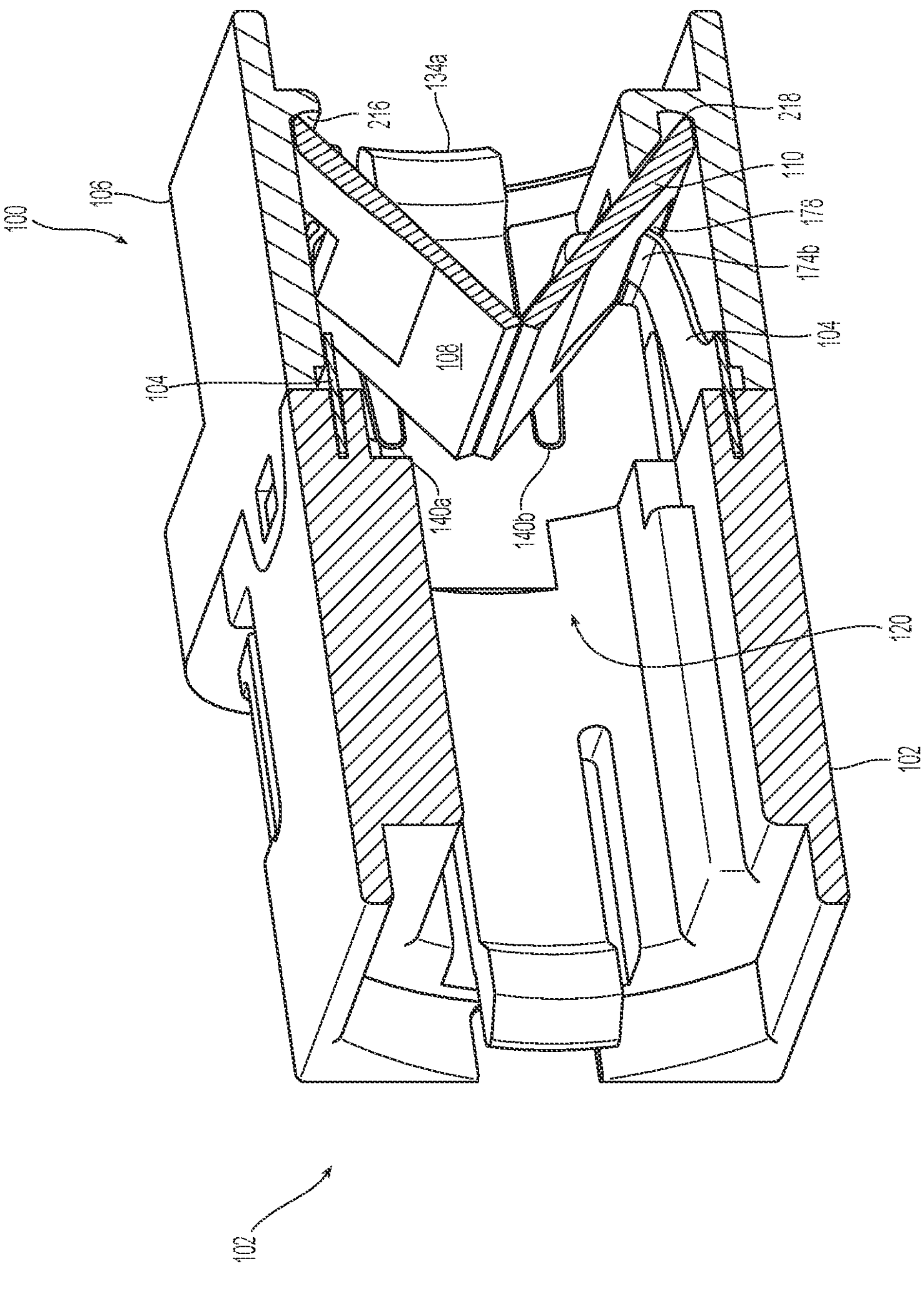
FIG. 17 is a cross sectional view along the length of the adapter assembly.

Within the inside surface 190 are a number of features that are complementary to the features in the adapter body 102. First, there are four cap inserts 212 that extend from the inside surface 190 into the opening 192. As noted above, there are openings or gaps 140*a*,140*b*,142*a*,142*b* between the latch arms 134*a*,134*b* and the pivot arms 130*a*,130*b*, 132*a*,132*b*. See FIGS. 6 and 15. As illustrated in FIGS. 12 and 14B, there are four cap inserts 212*a*,212*b*,212*c*,212*d*, that occupy the space between the gaps 140*a*,140*b*,142*a*, 142*b* and the latch arms 134*a*,134*b* when the retention cap 106 is attached the adapter body 102. As a result, when the retention cap 106 is fully assembled with the adapter body 102, the gaps 140*a*,140*b*,142*a*,142*b* are completely sealed and no dust and/or debris can enter the fiber optic adapter assembly 100.

Between the cap inserts 212 on either side of the opening 192 are grooves 214 to accommodate the latch arms 134*a*, 134*b*. See FIGS. 12 and 13. Toward the front of the opening 192 are receptacles or pivot receptacles 216 and 218 to receive at least a portion of the at least one rounded edge 152 and the two cylindrical projections 154*a*,154*b* of the shutters 108,110. See FIGS. 12 and 15. When the retention cap 106 is attached to the adapter body 102, the receptacles 206 and 208 and the pivot arms 130*a*,130*b*,132*a*,132*b* (and the pivot ends 144*a*,144*b*,144*c*,144*d* in particular) retain the shutters within the fiber optic adapter assembly 100 and allow the shutters 108,110 to rotate as the fiber optic connector 50 is inserted or removed.

The retention cap 106 also has constraint features 220 that extend from the inside surface 190. These constraint features 220 engage the inner housing 56 of the fiber optic connector 50 when it is inserted into the fiber optic adapter assembly 100. The constraint features 220 keep the fiber optic connector 50 from moving horizontally (side-to-side) within the fiber optic adapter assembly 100—just as the shutters 108, 110 and spring clip 104 keep the fiber optic connector 50 from moving vertically within the fiber optic adapter assembly 100 as noted above.

Figure 24:
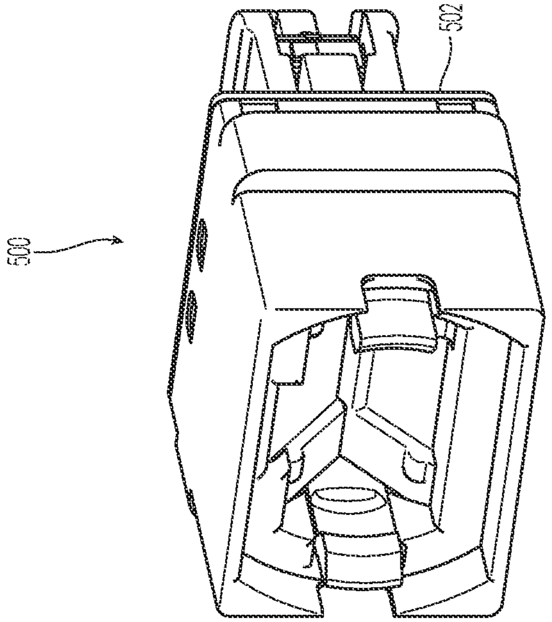
FIG. 24 is a perspective view of another embodiment of an adapter assembly according to the present invention.
Figure 26:
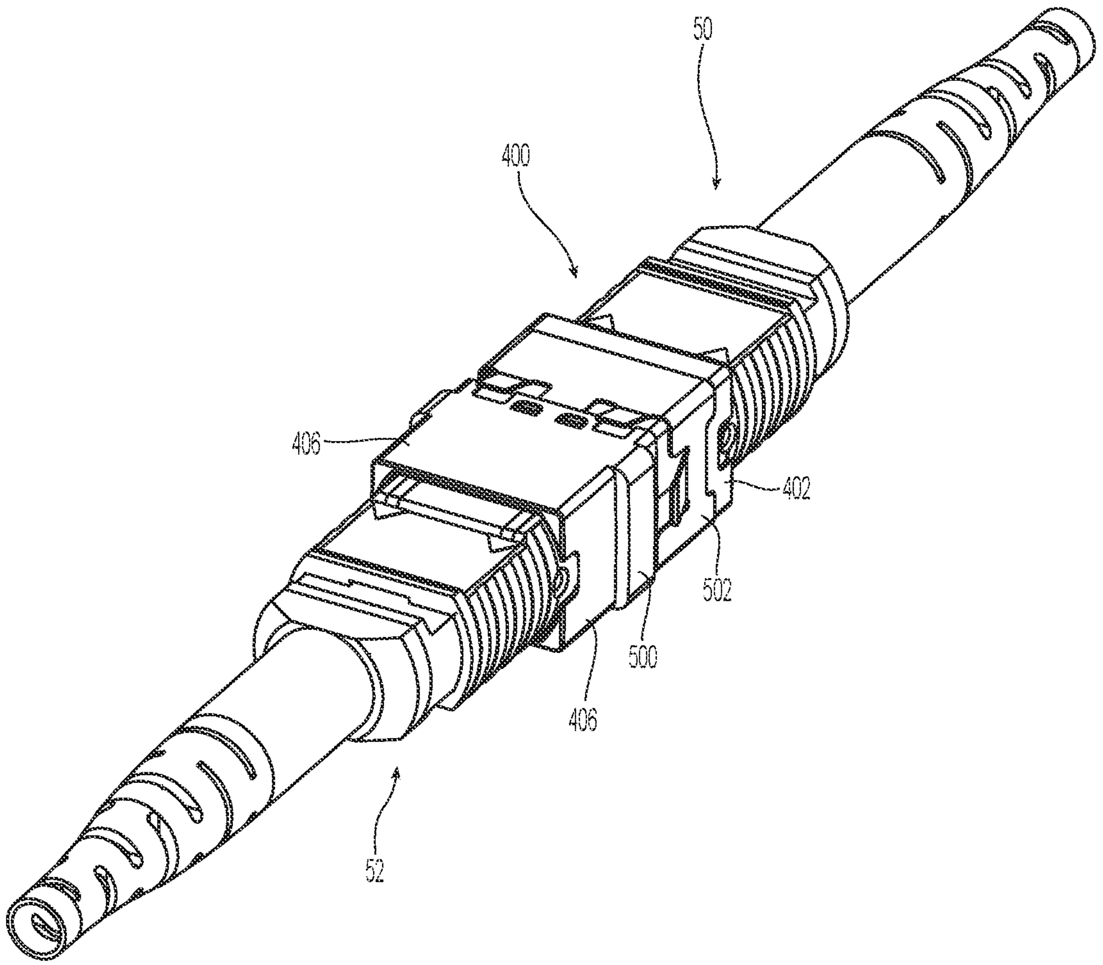
FIG. 26 is a perspective view of another embodiment of an adapter assembly according to the present invention with two MPO fiber optic connectors.
Figure 27:
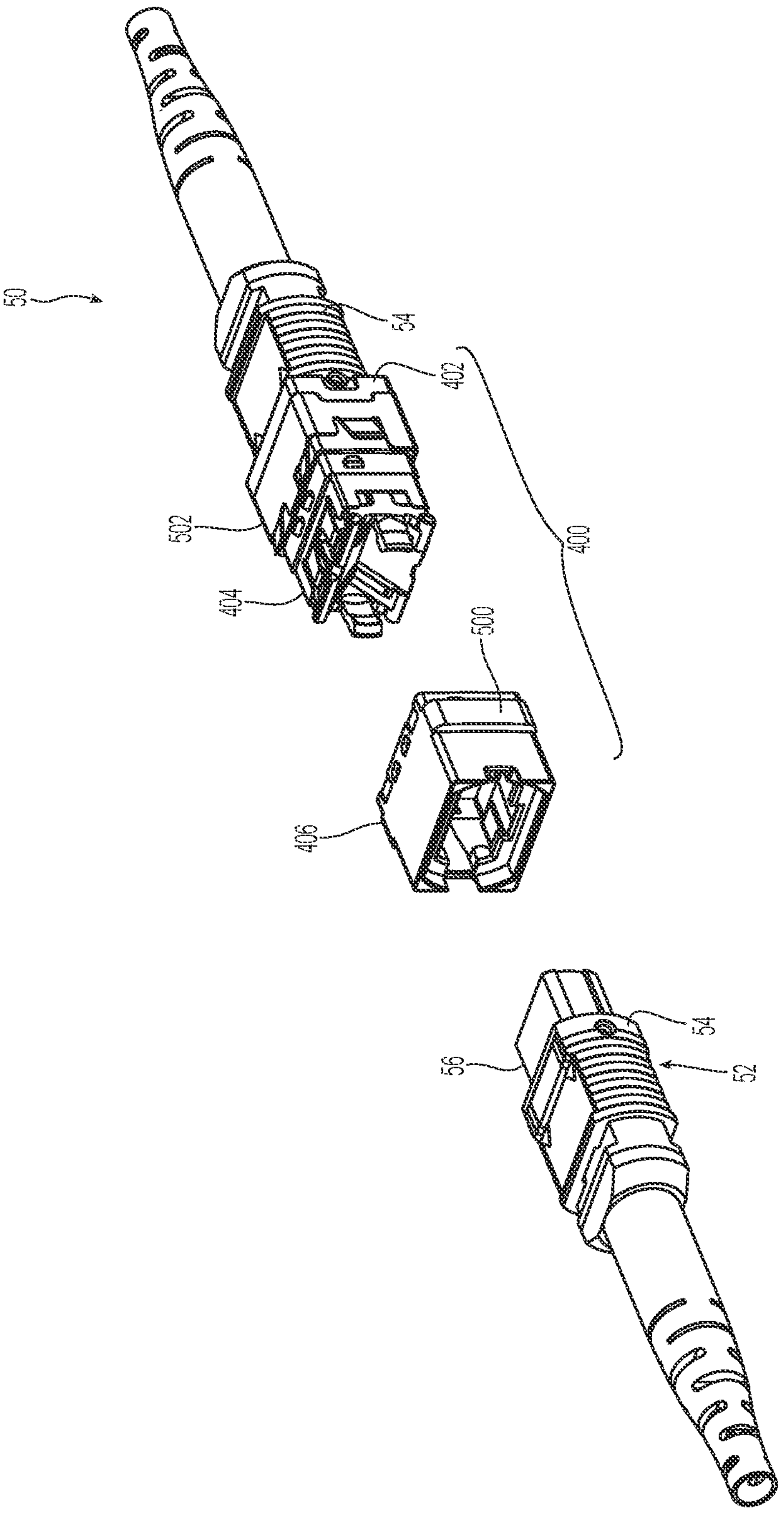
FIG. 27 a partially exploded perspective view the adapter assembly and two MPO fiber optic connectors in FIG. 26.

In yet another alternative embodiment of a fiber optic adapter assembly 500 the adapter body 502 receives not a fiber optic connector 52, but an MT ferrule on one side. As illustrated in FIG. 24, the adapter body 502 is configured to receive only the MT ferrule (or other fiber optic ferrule) and not the whole connector on the side longitudinally opposite to where the shutters 108,110 are placed. The interior of the adapter body 402 has similar features as that of the adapter body 102 above: latch arms, pivot arms and pivot ends, etc. The retention cap 106 too is attached to the adapter body 502 in a similar manner as attached to the adapter body 102. The side receiving the MT ferrule may have latches positioned to hold the MT ferrule securely, as described in Applicant's U.S. Pat. No. 11,237,339, the entire contents of which are incorporated by reference herein.

A process to assemble the fiber optic adapter assembly 100 and the fiber optic adapter assembly 500 will now be described with respect to the fiber optic adapter assembly 100, and similar process is followed for the fiber optic adapter assembly 500. The process includes attaching the shutters 108,110 into respective receptacles 216, 218 of the retention cap 106. In parallel, or at any time prior to attachment of the retention cap 106 to the adapter body 102, the spring clip 104 is attached to the adapter body 102. More specifically, the tabs 170 are inserted into the tab receptacle 172 of the adapter body 102. The adapter body 102 is then brought toward the opening 192. The two latch arms 134*a*, 134*b* are guided into the retention cap 106 by the grooves 214 until the four cap inserts 212*a*,212*b*,212*c*,212*d*, fully seal the space between the gaps 140*a*,140*b*,142*a*,142*b*, and the retention cap 106 engages the front facing surface 136. At this time, part of the rounded edge 152 of the two shutters 108,110 is seated against the respective receptacles 216,218 and the remaining part is on the pivot ends 144*a*,144*b*,144*c*, 144*d*. Thus, the two shutters 108,110 are completely inside the assembly of the retention cap 106 and the adapter body 102 forming the fiber optic adapter assembly 100.

According to the present invention there also is a fiber optic adapter assembly comprising an adapter body having a main opening to receive at least one fiber optic connector, the main opening surrounded circumferentially by a top side, a bottom side, a first side surface and a second side surface between the top side and the bottom side, the first side surface being opposite the second side surface, the adapter body further including a first pair of pivot arms adjacent the first side surface and extending longitudinally away from a forward facing surface around the main opening, a second pair of pivot arms adjacent the second side surface and extending longitudinally away from the forward facing surface around the main opening, and a first shutter positioned on one of the first pair of pivot arms and one of the second pair of pivot arms adjacent the top, a second shutter positioned on the other of the first pair of pivot arms and the other of the second pair of pivot arms adjacent the bottom side, each of the first shutter and the second shutter moveable between an open position and a closed position, wherein the fiber optic adapter further including a spring clip positioned around a portion of the adapter body, the spring clip including a plurality of fingers moveably contacting each of the first shutter and the second shutter.

The fiber optic adapter assembly may also have a retention cap attached to the adapter body enclosing the spring clip, the first shutter and the second shutter, wherein the first shutter and the second shutter pivot at least partially within the retention cap and at least partially at the respective pivot arms.

The retention cap may include a plurality of inserts to be received in each of the respective gaps of the adapter body such that when assembled, each of the plurality of inserts fully closes the respective gaps.

The adapter body of the fiber optic adapter assembly may have a first latch arm between the first pair of pivot arms and a second latch arm between the second pair of pivot arms, wherein the first latch arm is separated from each of the first pair of pivot arms by a gap and the second latch arm is separated from each of the second pair of pivot arms by a gap, wherein each of the respective gaps between the first latch arm and the first pair of the pivot arms and the second latch arm and the second pair of pivot arms extends behind each of the first shutter and the second shutter when in the closed position.

The spring clip of the fiber optic adapter assembly fits around the pivot arms rearward of the pivot ends of the pivot arms where the shutters are placed.

The spring clip of the fiber optic adapter assembly is bound by four L-shaped ledges at respective corners thereof that conform to a geometry of the pivot arms.

The shutters of the fiber optic adapter assembly have a pair of recesses in a rear portion thereof that accommodate a relative movement of the fingers of the spring clip as the shutters open and close.

The spring clip of the fiber optic adapter assembly has a skeletal structure with at least one tab at its rearmost part which fits inside a tab receptacle in a tap and/or bottom position of the adapter body.

The fingers of the spring clip of the fiber optic adapter assembly end in arcuate portions adapted to slide within respective recesses of the shutters.

The retention cap of the fiber optic adapter assembly wherein inside a retention cap opening, an inner surface thereof includes the plurality of retention cap inserts on each side to fit into cap insert recesses or gaps of the adapter body, the retention cap inserts start rearwardly from constraint features provided within the retention cap opening, and wherein the cap inserts, when fully inserted inside respective gaps between the pivot arms and the latch arms of the adapter body extend past the fully closed shutters in the direction toward a main opening of the adapter body.

The fiber optic adapter assembly has between the retention cap inserts on each side of an inner surface of the retention cap, a latch arm groove is provided to accommodate respective latch arms from the adapter body.

The fiber optic adapter assembly wherein the retention cap abuts a forward facing surface of the adapter body and is flush therewith all around the periphery of the adapter body.

The shutter of the fiber optic adapter assembly has a generally planar body with a groove along its length having a width that can accommodate differently positioned keys in different multi-fiber MPO connector types.

The pivot arms of the fiber optic adapter assembly are integral with the shutter.

Figure 28:
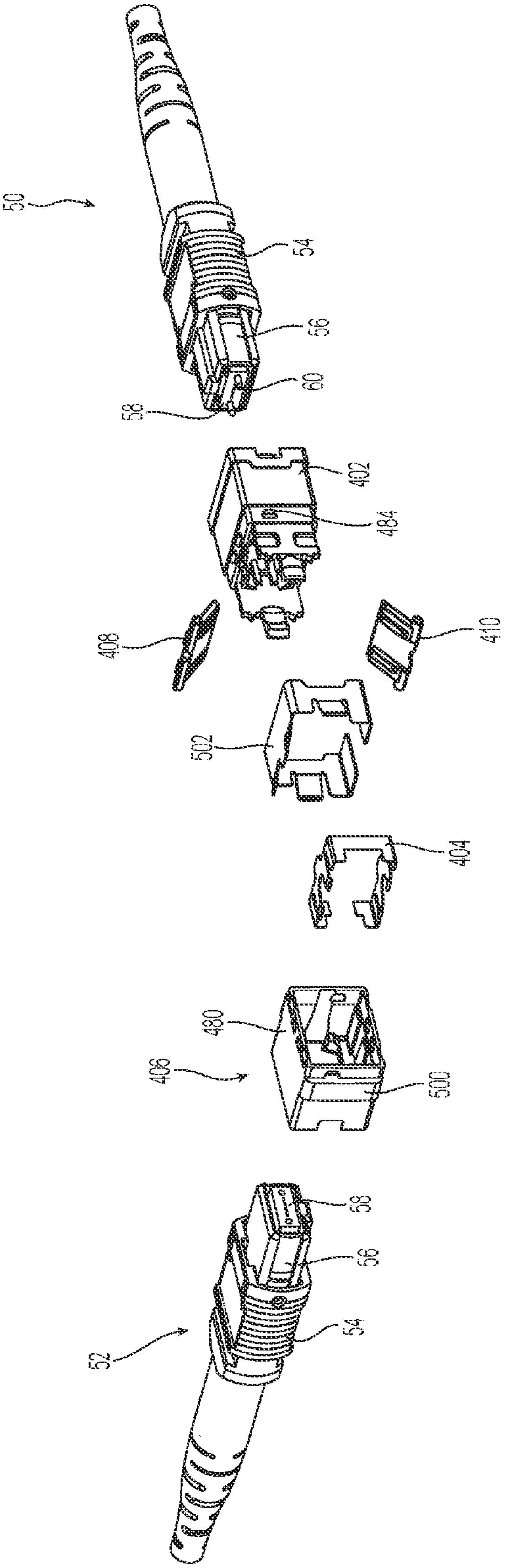
FIG. 28 is an exploded view of the adapter assembly of FIG. 26.

Another embodiment of a two-piece fiber optic adapter assembly 400 is illustrated in FIGS. 26-42. This embodiment of the fiber optic adapter assembly 400 may be used with two fiber optic connectors 50 and 52, one having a male configuration 50 and the other having a female configuration 52. See FIG. 28. The fiber optic connectors 50,52, which are the same as with the first embodiment, can be inserted from either side of the fiber optic adapter assembly 400. The fiber optic connectors 50,52 have an outer housing 54, an inner housing 56, a multi-fiber fiber optic ferrule 58 and, depending on the configuration of the fiber optic connector, guide pins 60. As illustrated herein, the fiber optic adapter assembly 400 preferably includes an adapter body 402, a spring element or spring clip 404 and a retention cap 406. The fiber optic adapter assembly 400 also includes two shutters 408, 410 that are disposed within the fiber optic adapter assembly 100. See FIGS. 27-29 and 37-38.

Figure 34:
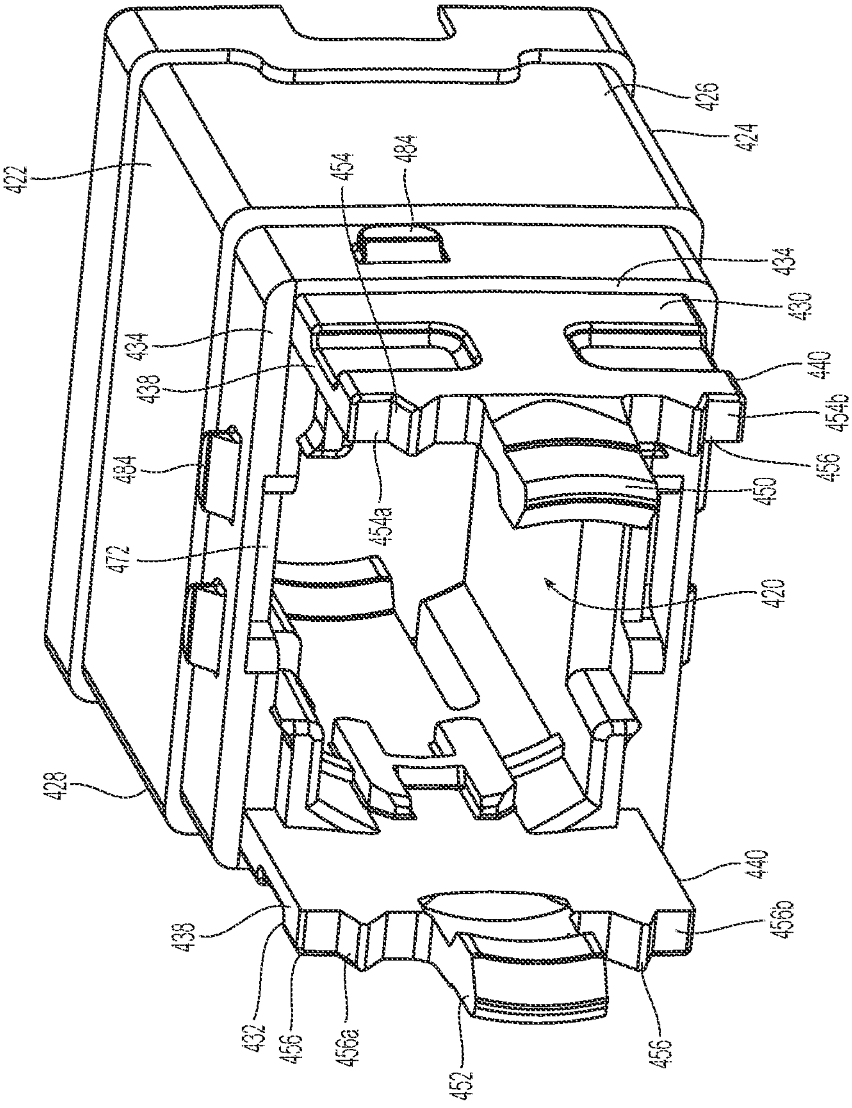
FIG. 34 is a perspective view of the adapter assembly of FIG. 26.
Figure 35:
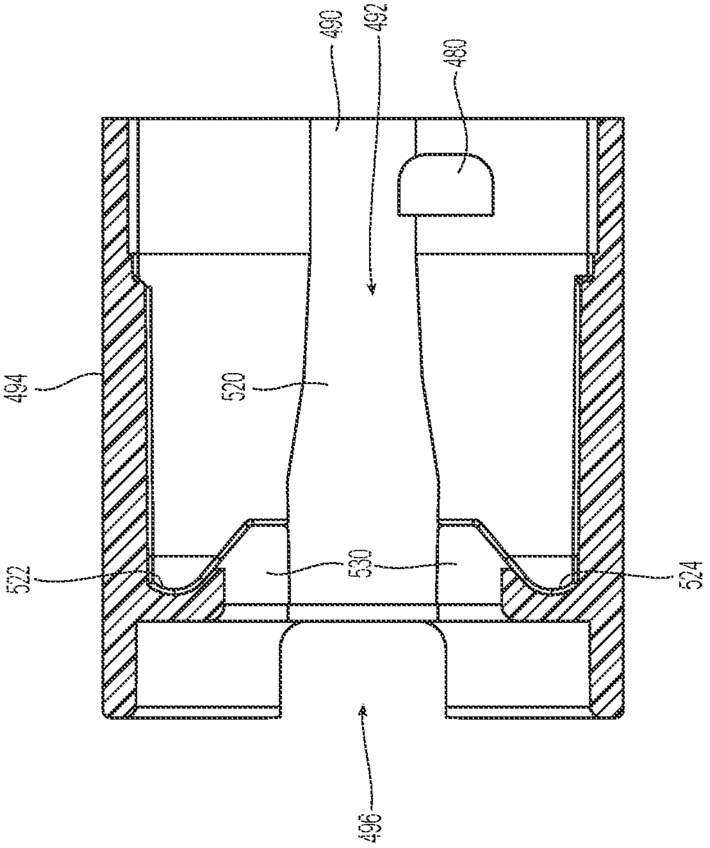
FIG. 35 is a cross section of the retention cap used with the adapter assembly of FIG. 26.
Figure 36:
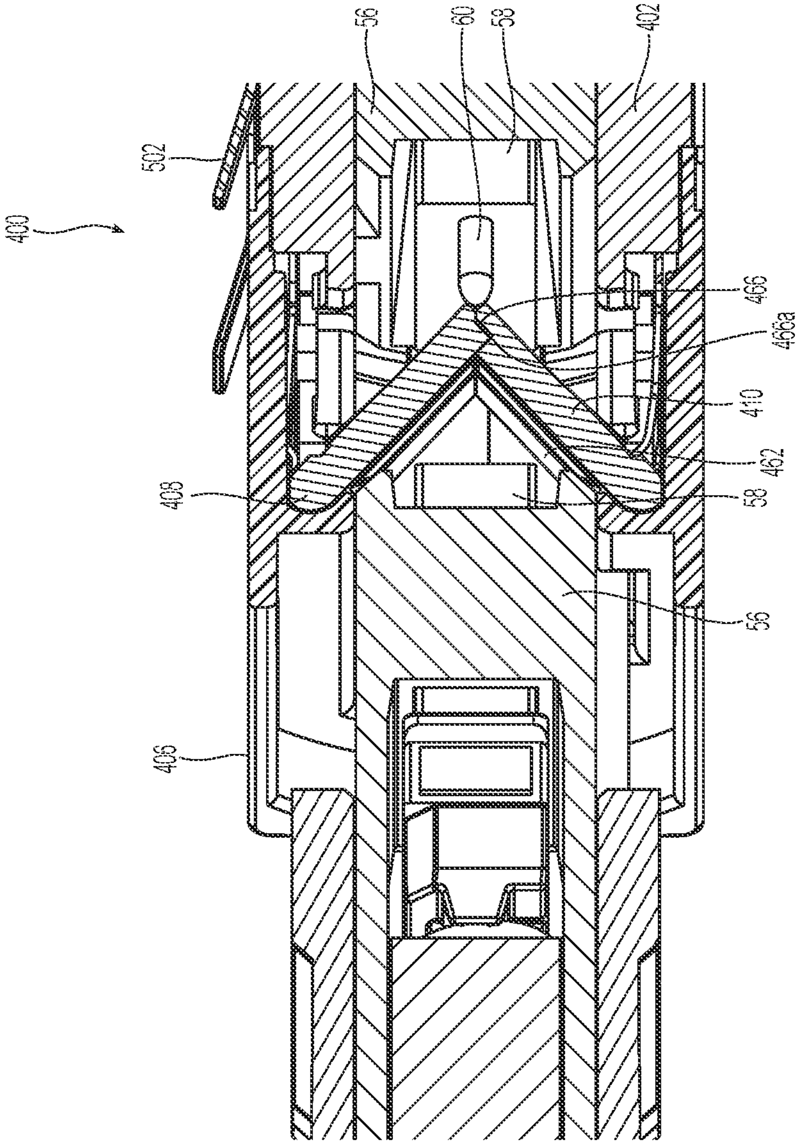
FIG. 36 is a cross section view from the side of the adapter assembly of FIG. 26.
Figure 38:
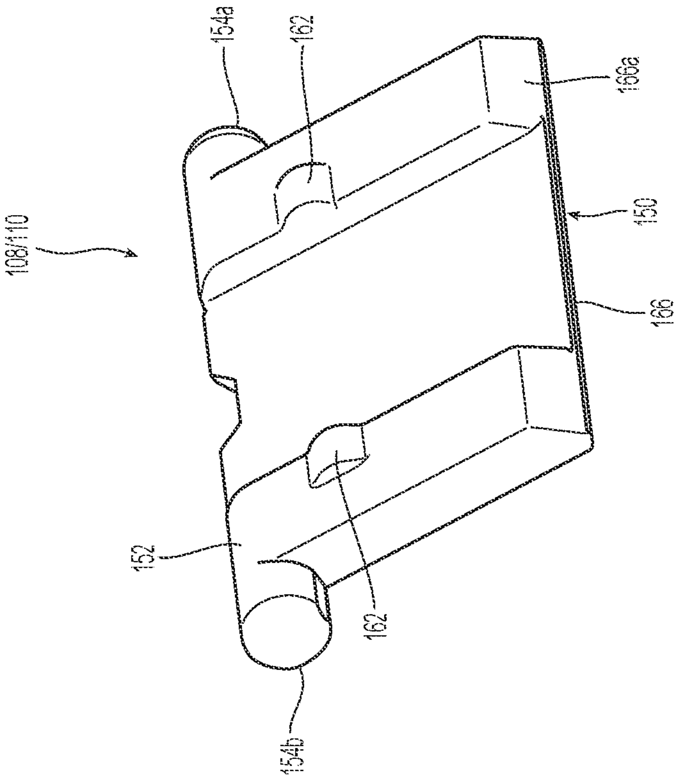
FIG. 38 is a perspective view of the shutters from the prior embodiment for comparison.

Referring, for example, to FIG. 34, the adapter body 402 of the fiber optic adapter assembly 400 has a main opening 420 to receive at least one of the fiber optic connectors 50,52 from each side of the fiber optic adapter assembly 400. The main opening 420 of the adapter body 402 is circumferentially surrounded by a top side 422, a bottom side 424, a first side surface 426 and a second side surface 428. The first side surface 426 and the second side surface 428 function to separate the top side 422 from the bottom side 424 and are on opposing sides of the main opening 420. See FIGS. 29 and 34.

The adapter body 402 of the fiber optic adapter assembly 400 has two pivot walls 430,432. The first pivot wall 430 is adjacent the first side surface 426 and extends longitudinally away from the main opening 420 and a forward facing surface 434 that is around the main opening 420. The second pivot wall 432 is adjacent the second side surface 428 and extends longitudinally away from the main opening 420 and the forward facing surface 434 around the main opening 420. The two pivot walls 430,432 are on opposite sides of the main opening 420 of the adapter body 402 along a lateral dimension of the adapter body 402. Each of the pivot walls 430,432 are solid (no holes or openings) between a top edge 438 and a bottom edge 440. These solid pivot walls 430,432 keep the dust and debris away from the main opening 420. It is noticed, when compared with the adapter above (see FIG. 6), that two pivot walls 430,432 completely fill in the area and negate the gaps 140*a*,140*b*,142*a*,142*b* in that embodiment. See FIGS. 6 and 44.

Extending away from each of the two pivot walls 430,432 is a connector latch arm 450,452—a first latch arm 450 is integral with and extends longitudinally from the first pivot wall 430 and also away from the main body 402. The second latch arm 452 is integral with and extends from the second pivot wall 432 and also longitudinally away from the main body 402. Both of the latch arms 450,452 are configured to engage a mating fiber optic connector, like fiber optic connectors 50 and 52. However, the fiber optic connectors 50 and 52 may have other forms. The latch arms 450,452 are identical in structure and may also be thicker than is normally seen with the conventional MPO connector adapters.

Figure 29:
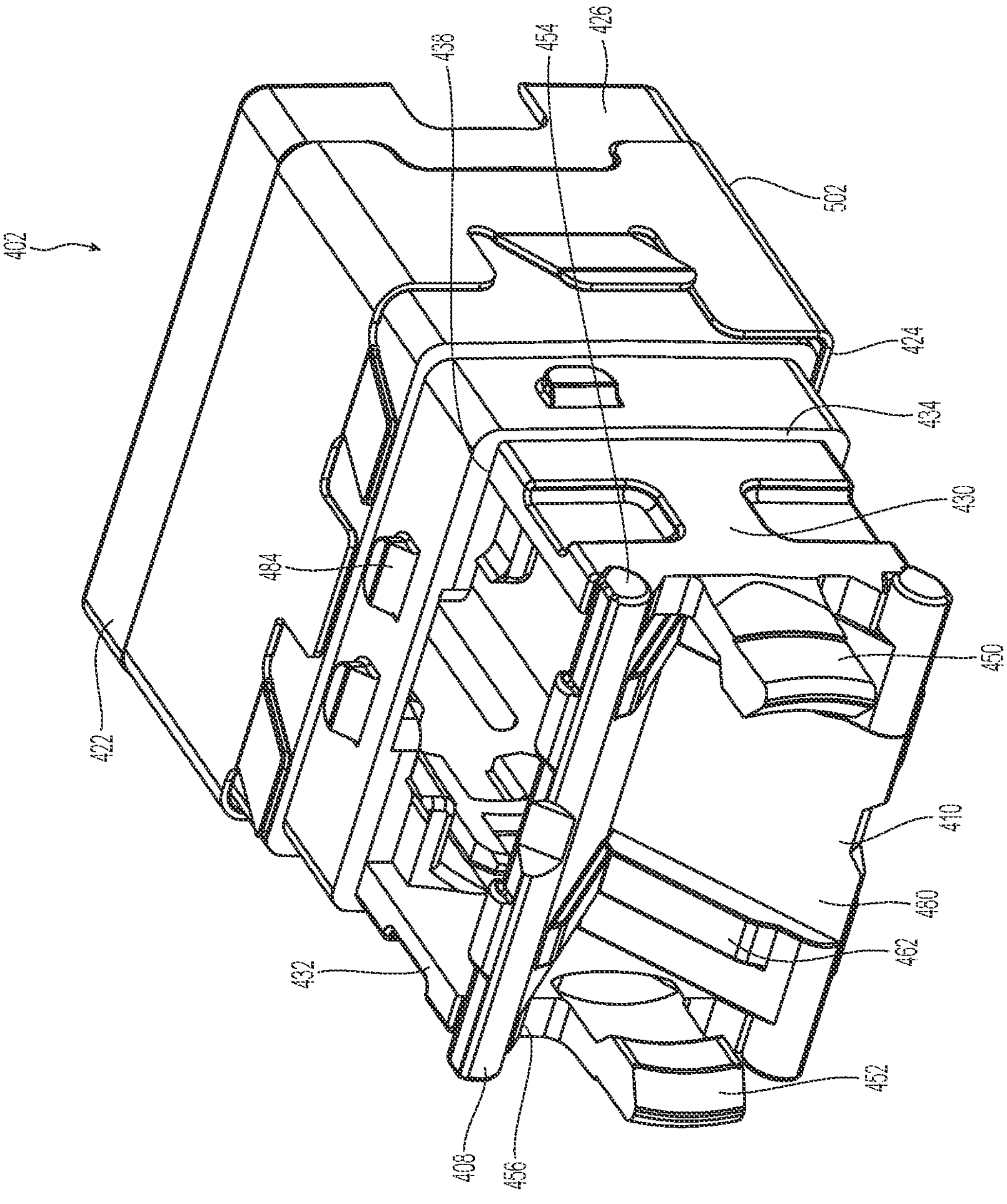
FIG. 29 is an enlarged perspective view of a portion of the adapter assembly in FIG. 26 with shutters disposed therein.
Figure 30:
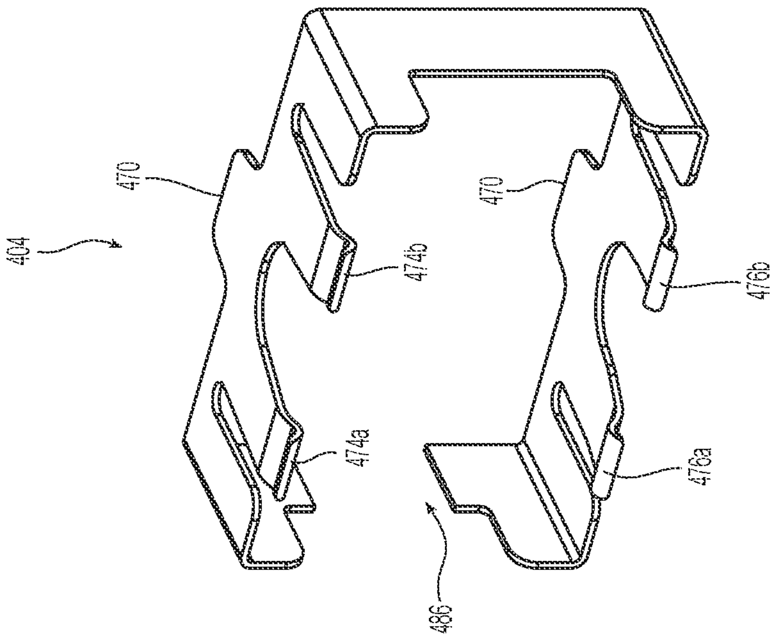
FIG. 30 is a perspective view of a spring clip used in the adapter assembly in FIG. 26.
Figure 31:
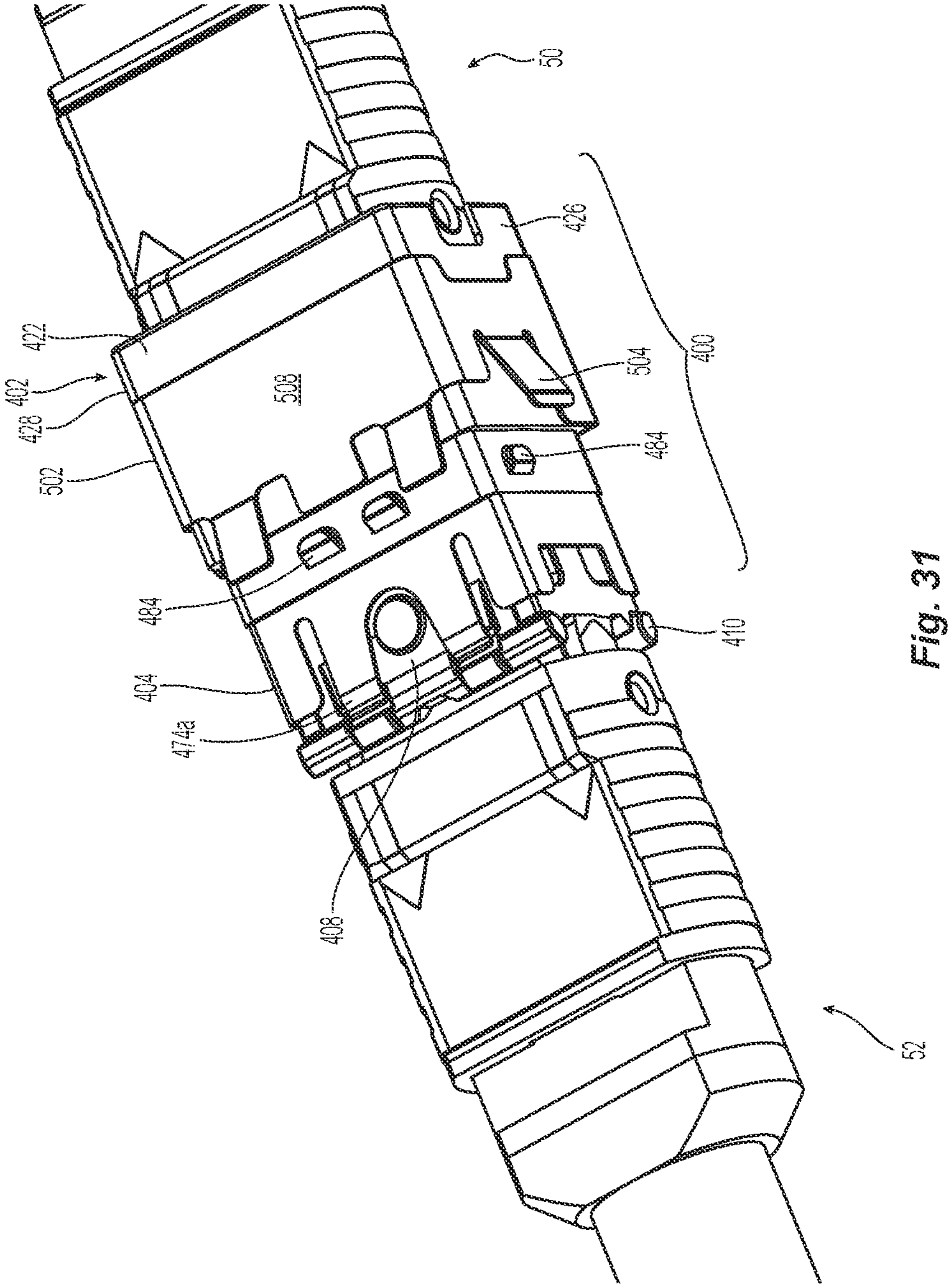
FIG. 31 is a perspective view of the adapter assembly of FIG. 26 with the retention cap removed.
Figure 33:
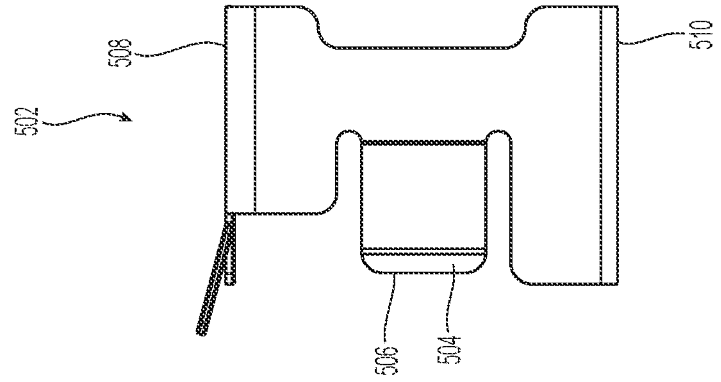
FIG. 33 is a side elevation view of the panel clip in FIG. 33.
Figure 32:
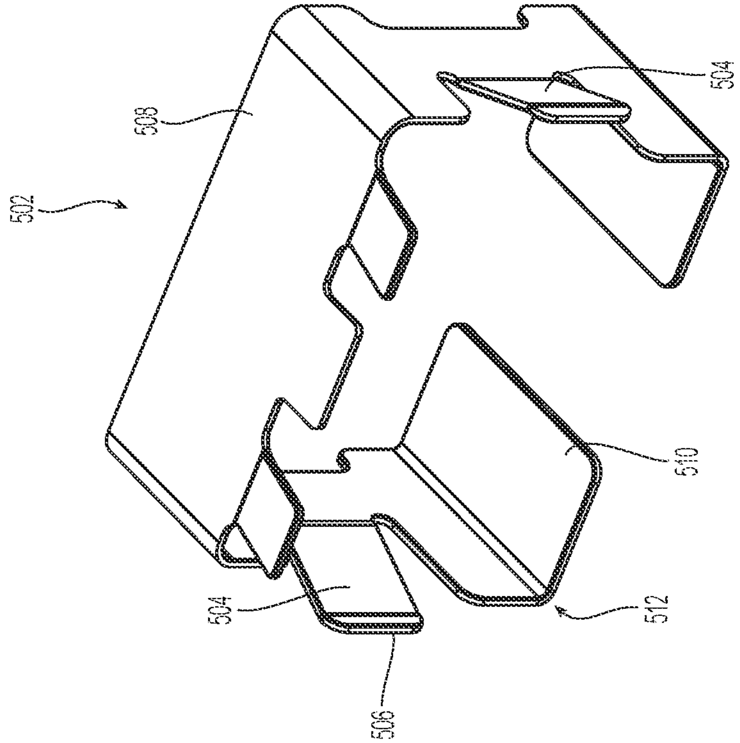
FIG. 32 is a perspective view of a panel clip used with the adapter assembly of FIG. 26
Figure 44:
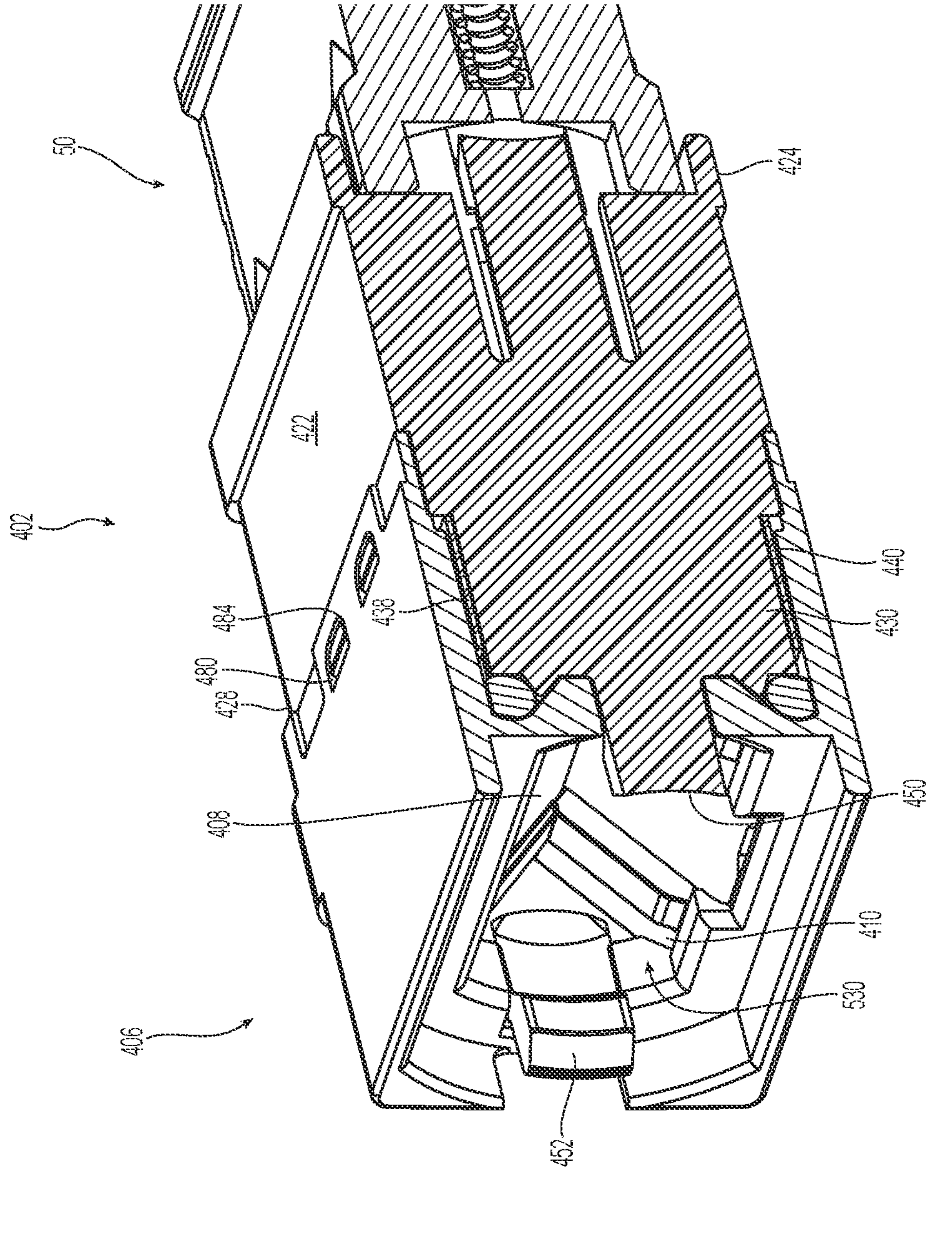
FIG. 44 is a cross section view of the adapter assembly in FIG. 26 and one MPO fiber optic connector inserted into the adapter body

Each of the pivot walls 430,432 have pivot surfaces 454,456, respectively, to engage shutters 408,410. The first pivot wall 430 has pivot surfaces 454*a* by the top edge 438 and pivot surfaces 454*b* at the bottom edge 440. The second pivot wall 432 has pivot surfaces 456*a* by the top edge 438 and pivot surfaces 456*b* at the bottom edge 440. See FIG. 34. As illustrated in FIGS. 29, 34, and 44, this means that there are two pivot surfaces on each of the corners of the pivot walls 430,432 to receive portions of the shutters 408,410. While there are two generally flat surfaces that make up the pivot surfaces 454,456, they could also be arcuate/curved/semi-circular in configuration. The generally flat (pivot) surfaces 454,456, may also be of a v-shape or even an L-shape. The pivot surfaces 454,456 may also be referred to as pivot ends.

Figure 37:
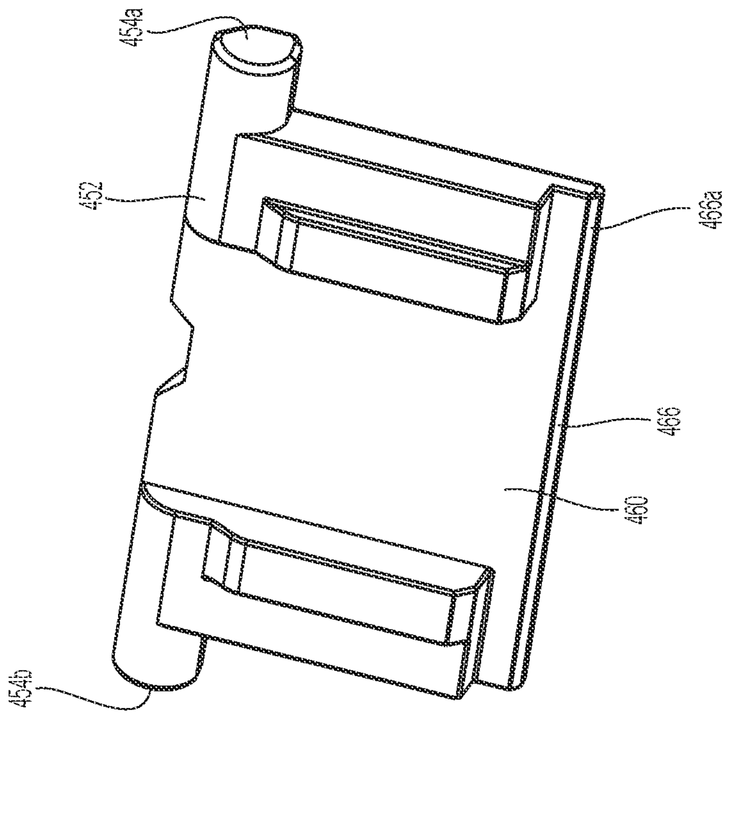
FIG. 37 is a perspective view of the shutters used with the adapter assembly of FIG. 26.
Figure 40:
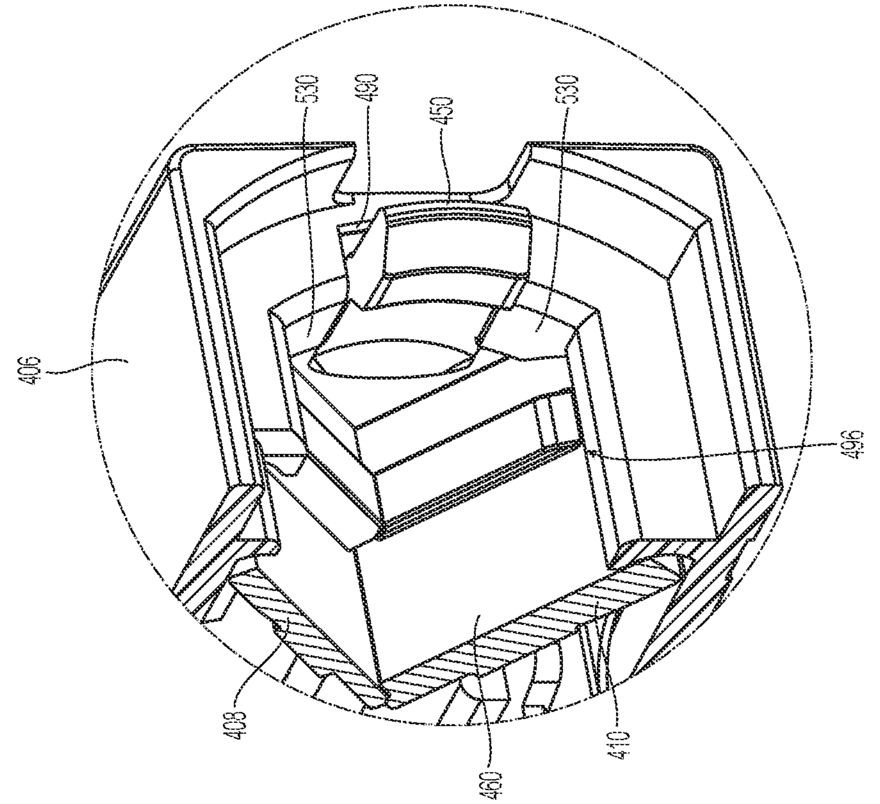
FIG. 40 is an enlarged perspective view of a cross section of the adapter assembly in FIG. 26, showing bumps in the retention cap.
Figure 39:
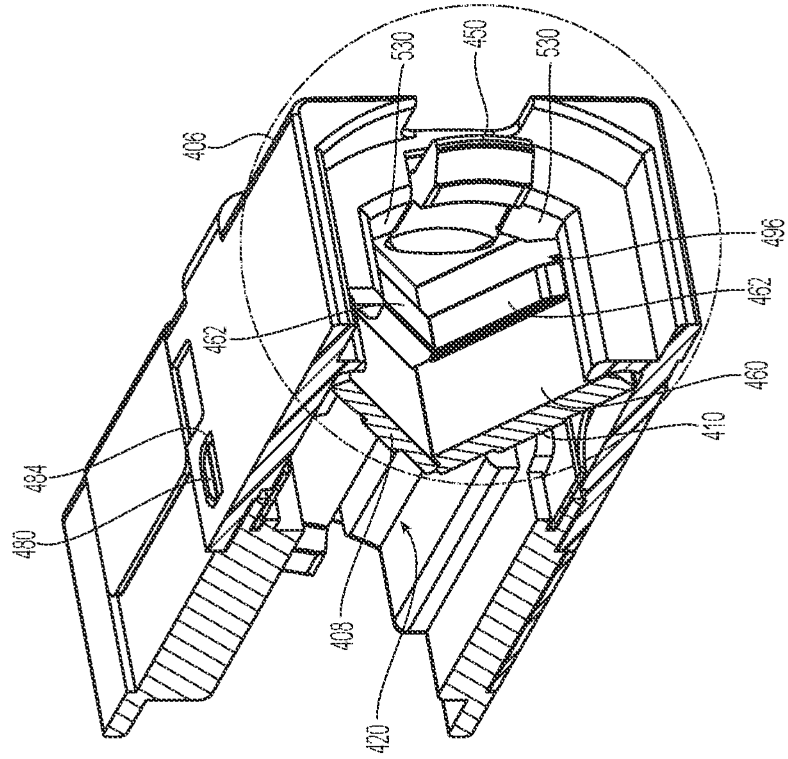
FIG. 39 is a perspective view of a cross section of the adapter assembly in FIG. 26, showing bumps in the retention cap and the latch arms in front of the shutters.

As best seen in FIG. 37, but also clearly visible in FIGS. 29 and 39, the two shutters 408,410 are generally planar and preferably have a central section 450 that is generally rectangular with at least one rounded edge 452 and two cylindrical projections 454*a*,454*b* extending outward from the central section 450 at the rounded edge 452. Thus, the two cylindrical projections 454*a*,454*b* can be considered to be an extension of the at least one rounded edge 452. The two cylindrical projections 454*a*,454*b* are to be disposed on the pivot surfaces 454,456, (e.g. 454*a*,454*b*,456*a*,456*b*). See FIG. 29. As illustrated in FIG. 29, the two cylindrical projections 454*a*,454*b* of shutter 408 are disposed on the pivot surfaces 454*a*,456*a* while the two cylindrical projections 454*a*,454*b* of shutter 410 are disposed on the pivot surfaces 454*b*,456*b*. The shutters 408,410 are disposed within the pivot surfaces such that the shutters 408,410 extend back toward the main opening 420 of the adapter body 402. FIGS. 36 and 39-42.

Figure 43:
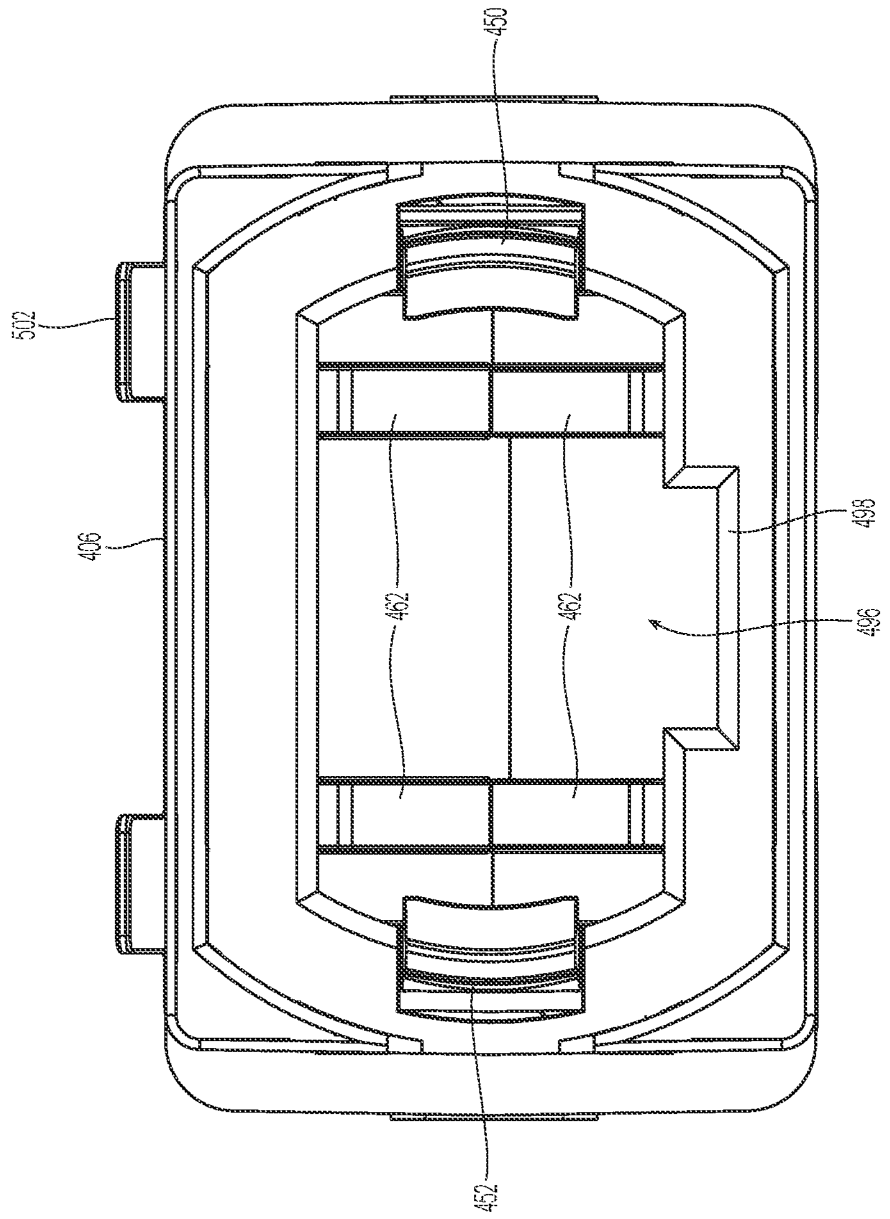
FIG. 43 is front elevational view of the opening in the retention cap to show that the opening is sealed.

On at least one side of the shutters 408,410 is a groove 460 that corresponds to the size of a multi-fiber fiber optic ferrule 58. See, e.g., FIG. 37. The groove 460 has a width that can accommodate differently positioned keys in different multi-fiber MPO connector types, e.g., from 8-16 fiber MPO connectors. For example, the key on the housing of a 16 fiber MPO connector is offset from a center of the housing, but the key for an 8 fiber MPO connector is centrally located on the housing (as is known in the art). Thus, the groove 460 could be in a different position of the shutters 408,410 for different fiber optic connectors, but the position shown in the figures is a universal one accommodating different positions of the key on the housing. The shutters 408,410 may also have elongated projections or bumps 462 that are positioned to engage the inner housing 56 as the fiber optic connector 50 is moved into the adapter assembly 100. See FIGS. 24 and 25. With the elongated bumps 462 on both of the shutters 408,410, they also assist in maintaining the fiber optic connector 50 within the center of the main opening 420 so that it can more easily mate with the other fiber optic connector 52. At a front edge 466 of the shutters 408,410 are flat surfaces 466*a* (see, e.g., FIG. 37) that are configured to engage one another when the fiber optic connector is not inserted into the main opening 420, and the shutters 408,410 are in a closed position. See also FIG. 43. This engagement prevents the light from the fiber optic connector 52 from exiting out the front end of the adapter assembly 400.

Figure 41:
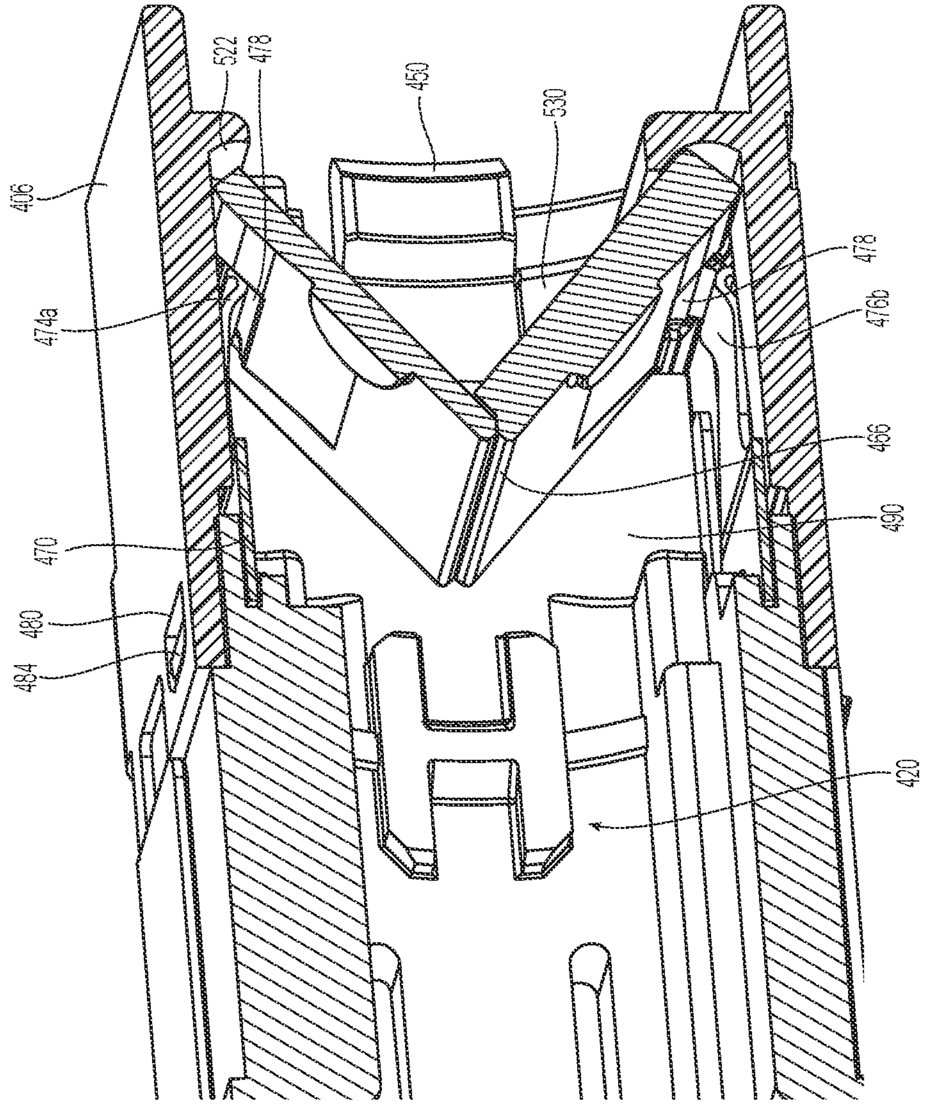
FIG. 41 is an enlarged perspective view of the opening in the adapter body.
Figure 42:
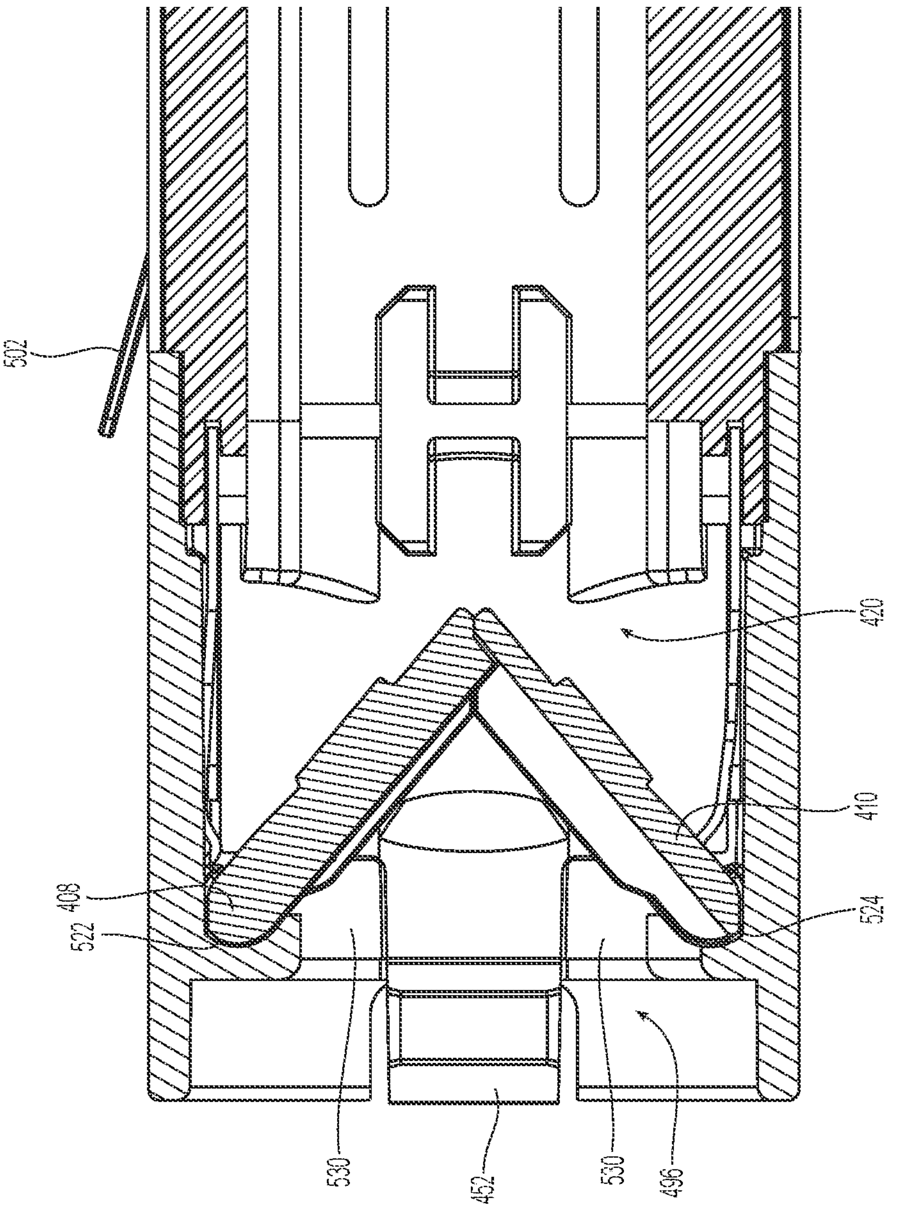
FIG. 42 is a side view of a cross section of the adapter assembly in FIG. 26.

The fiber optic adapter assembly 400 also includes a spring element or spring clip 404 that at least partially surrounds the adapter body 402 at the front end thereof. The spring element or spring clip 404 is designed to fit around the pivot walls 430,432 adjacent the front facing surface 434 and therefore has a generally rectangular shape as well. See, e.g., FIGS. 27, 28 and 31. The spring clip 404 preferably has two tabs 470 that extend rearwardly therefrom to engage the adapter body 402. See FIG. 30. The tabs 470 are inserted into a tab receptacle 472 in the adapter body 402, preferably at the top side 422 and the bottom side 424 so as not to interfere with the latch arms 450,452 and/or the pivot walls 430,432. This engagement of the spring clip 404 with the adapter body 402 provides the leverage needed to bias the shutters 408,410. There are also two sets 474,476 of two fingers 474*a*,474*b* and 476*a*,476*b* extending in a direction opposite the two tabs 470. The two sets fingers 474,476 each engage one of the shutters 408,410, which bias the shutters toward a closed position. See FIGS. 31 and 9. There may be recesses 478 in the shutters 408,410 into which the two sets of fingers 474,476 are disposed. FIG. 41. The recesses 478 in the shutters 408,410 would be on the opposite side of the shutters 408,410 from the elongated projections or bumps 462 and the groove 460 While the spring clip 404 is illustrated as one piece, it could be multiple pieces or may be a single piece with a discontinuity 486 (a break) to allow for easier installation on the adapter body 102. See FIG. 30 The two sets of fingers 474,476 do move relative to the shutters 408,410 during the movement of the shutters 408, 410 as the fiber optic connectors 50,52 are inserted into and removed from the fiber optic adapter assembly 400.

The fiber optic adapter assembly 400 includes a retention cap 406. See FIGS. 26, 27, 28, 35, 39, 42-44. The retention cap 406 attaches to the front end of the adapter body 402. Thus, the retention cap 406 encloses the two shutters 408, 410 and the spring clip 404 within the fiber optic adapter assembly 400. In one way to connect the retention cap 406 to the fiber optic adapter assembly 400, there are windows 480 therein present on at least two sides of the retention cap 406 to engage posts 484 on the top side 422 and the bottom side 424 of the adapter body 402. See FIGS. 27, 29, 31, 34. The posts 484 are preferably disposed on the top and bottom surfaces 422,424, but there may also be some posts on the sides 426,428. See, e.g., FIG. 34. There may be more or fewer of the openings and posts, depending on the users' choices. Also, the windows and the posts may be switched on the adapter assembly 400. As a result, the retention cap 406 is removably attached to the adapter body 402. It should be noted that the retention cap 406 may be difficult to remove so that the adapter assembly 400 is assured of passing strength testing and does not come apart easily. Other methods of connecting the retention cap 406 to the adapter body 402 could be used as well, even if the components are not removable.

The retention cap 406 has an inside surface 490 that defines an opening 492 and an outside surface 494. The fiber optic connector 50 is inserted into the fiber optic adapter assembly 400 through a cap opening 496 and is in communication with the opening 492. See, e.g., FIG. 35. The cap opening 496 may have a key groove 498 to ensure that the fiber optic connector 50 is inserted into the fiber optic adapter assembly 400 in the correct orientation (keyed entry). See FIG. 27. The retention cap 406 may also include flanges 500 that extend outward from the outside surface 494. See FIGS. 1 and 14A. The flanges 500 are used to prevent the fiber optic adapter assembly 400 from being pushed through the openings in any panel into which the fiber optic adapter assembly 400 is inserted. The flanges 500 may also be smaller, shorter, or placed on a different side of the retention cap 406. It should be noted that there may also be a panel clip 502 that, in conjunction with the flanges 500, keep the adapter 402 within a panel. See FIGS. 32 and 33. A pair of central side tabs 504 have a free end 506 that is forward of the top side 508 of the adapter panel clip, but shorter than the bottom side 510. See FIGS. 32 and 33. Further, the bottom side wraps around the bottom side 512 of the adapter body to better secure the adapter body 402 to the panel. The features of the panel clip are well-known in the art and will not be discussed in detail here.

On either side of the opening 492 are grooves 520 to accommodate the latch arms 450,452. See FIG. 35. Toward the front of the opening 492 are surfaces 522 and 524 to receive at least a portion of the at least one rounded edge 452 and the two cylindrical projections 454*a*,454*b* of the shutters 408,410 that are also in pivot surfaces 454*a*,454*b*,456*a*, and 456*b*. When the retention cap 406 is attached to the adapter body 402, surfaces 522 and 524 (and more particularly 522*a*, 522*b*, 524*a*, and 524*b*) along with pivot surfaces 454*a*,454*b*, 456*a*, 456*b* retain the shutters 408,410 within the fiber optic adapter assembly 400 and allow the shutters 408,410 to rotate as the fiber optic connector 50,52 is inserted or removed. Thus, the shutters 408,410 pivot at least partially within the retention cap 406 and at least partially at the respective pivot surfaces 454*a*,454*b*,456*a*,456*b* of the first pivot wall 430 and the second pivot wall 432.

The retention cap 406 also has bumps 530 on the inside surface 490 next to the edges of the shutters 408,410. These bumps 530 are where the first latch arm 450 and the second latch arm 452 are positioned near the grooves 520 to of the retention cap 406. There are two such bumps 530 on each side (corresponding to the sides 426,428 of the adapter body 402) of the retention cap 406 and on each side, one of the bumps 530 is above the groove 520 and one of the bumps 530 is below the groove 520. See FIGS. 35, 39-40 and 44. As a result of this configuration, when the first shutter 408 and the second shutter 410 are in a closed position and engaged to each other, the first latch arm 450 and the second latch arm 452 are positioned fully forward of the first shutter 408 and the second shutter 410. As best seen in FIG. 39-43, there is then no place for light to escape the adapter body when the shutters 408,410 are closed.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A two-piece fiber optic adapter assembly, comprising:

an adapter body having a main opening to receive at least one fiber optic connector, the main opening surrounded circumferentially by a top side, a bottom side, a first side and a second side between the top side and the bottom side, the first side and the second side on opposing sides of the main opening, the adapter body further comprising:

a first pivot wall adjacent the first side and extending longitudinally away from a forward facing surface around the main opening, the first pivot wall being solid from a top edge and a bottom edge and joining the top edge and the bottom edge, wherein the first pivot wall includes a pair of pivot surfaces to respectively receive a first shutter adjacent the top edge and a second shutter adjacent the bottom edge;

a second pivot wall adjacent the second side and extending longitudinally away from the forward facing surface around the main opening, the second pivot wall being solid from a top edge and a bottom edge and joining the top edge and the bottom edge, wherein the second pivot wall includes a pair of pivot surfaces to respectively receive the first shutter adjacent the top edge and the second shutter adjacent the bottom edge;

a first latch arm extending longitudinally away from the first pivot wall and away from the main opening, the first latch arm configured to engage a mating fiber optic connector, a second latch arm extending longitudinally away from the second pivot wall and away from the main opening, the second latch arm also configured to engage the mating fiber optic connector, wherein the first pivot wall and the second pivot wall are each positioned between the main opening and the respective first latch arm and the second latch arm in a longitudinal direction; and a retention cap attached to the adapter body enclosing the first pivot wall, the second pivot wall, the first latch arm, the second latch arm, the first adapter shutter and the second adapter shutter, wherein the first shutter and the second shutter pivot at least partially within the retention cap and at least partially at respective pivot surfaces of the respective pivot walls.

2. The two-piece fiber optic adapter assembly of claim 1, wherein when the first shutter and the second shutter are in a closed position and engaged to each other, the first latch arm and the second latch arm are positioned fully forward of the first shutter and the second shutter.

3. The two-piece fiber optic adapter assembly according to claim 1, further comprising a spring clip that extends around and engages an outer portion of the adapter body, the spring clip including a plurality of fingers moveably contacting each of the first shutter and the second shutter.

4. The two-piece fiber optic adapter assembly according to claim 3, wherein the spring clip has a tab to be inserted into a corresponding receptacle on the adapter body.

5. The two-piece fiber optic adapter assembly according to claim 1, wherein the first and second shutters each have a surface to receive a fiber optic ferrule disposed within the at least one fiber optic connector when inserted through the retention cap.

6. The two-piece fiber optic adapter assembly according to claim 1, wherein the retention cap has surfaces to engage the first shutter at first and third pivot surfaces and the second shutter at second and fourth pivot surfaces.

7. The two-piece fiber optic adapter assembly according to claim 1, wherein each of the first and second shutters have a flat surface at distal ends to engage one another in a closed position.

8. The two-piece fiber optic adapter assembly according to claim 1, wherein the retention cap has openings to receive posts on the adapter body to secure the retention cap to the adapter body.

9. The two-piece fiber optic adapter assembly according to claim 1, wherein the first and second shutters have an outwardly extending bump to engage an inner housing of the fiber optic connector to orient the fiber optic connector within the fiber optic adapter assembly.

10. The two-piece fiber optic adapter assembly according to claim 1, wherein the first pivot wall and the second pivot wall are continuously solid from the top edge to the bottom edge.

11. A two-piece fiber optic adapter assembly, comprising:

an adapter body having a main opening to receive at least one fiber optic connector, the main opening surrounded circumferentially by a top side, a bottom side, a first side and a second side between the top side and the bottom side, the first side being opposite the second side, the adapter body further including:

a first pivot wall adjacent the first side and extending longitudinally away from the main opening, the first pivot wall being solid from a top edge and a bottom edge and joining the top edge and the bottom edge, wherein the first pivot wall includes a first pivot surface adjacent the top edge and a second pivot surface adjacent the bottom edge;

a second pivot wall adjacent the second side and extending longitudinally away from the main opening, the second pivot wall being solid from a top edge and a bottom edge and joining the top edge and the bottom edge, wherein the second pivot wall includes a third pivot surface adjacent the top edge and a fourth pivot surface adjacent the bottom edge;

a first latch arm extending longitudinally away from the first pivot wall and away from the main opening, the first latch arm configured to engage a mating fiber optic connector;

a second latch arm extending longitudinally away from the second pivot wall and away from the main opening, the second latch arm also configured to engage the mating fiber optic connector, wherein the first pivot wall and the second pivot wall are each positioned between the main opening and the respective first latch arm and the second latch arm in a longitudinal direction; and a first shutter positioned on the first pivot surface adjacent the top edge of the first pivot wall and on the third pivot surface adjacent the top edge of the second pivot wall;

a second shutter positioned on the second pivot surface adjacent the bottom edge of the first pivot wall and the fourth pivot surface adjacent the bottom edge of the second pivot wall, each of the first shutter and the second shutter moveable between an open position and a closed position;

a retention cap attached to the adapter body enclosing each of the first shutter and the second shutter, wherein the first shutter and the second shutter pivot at least partially within the retention cap and at least partially at the respective pivot surfaces of the first pivot wall and the second pivot wall.

12. The two-piece fiber optic adapter assembly according to claim 11, further comprising a spring clip that extends around and engages an outer portion of the adapter body, the spring clip including a plurality of fingers moveably contacting each of the first shutter and the second shutter.

13. The two-piece fiber optic adapter assembly according to claim 12, wherein the spring clip has a tab to be inserted into a corresponding receptacle on the adapter body.

14. The two-piece fiber optic adapter assembly according to claim 11, wherein the first and second shutters each have a surface to receive a fiber optic ferrule disposed within the at least one fiber optic connector when inserted through the retention cap.

15. The two-piece fiber optic adapter assembly according to claim 11, wherein the retention cap has surfaces to engage the first shutter at the first and third pivot surfaces and the second shutter at the second and fourth pivot surfaces.

16. The two-piece fiber optic adapter assembly according to claim 11, wherein each of the first and second shutters have a flat surface at distal ends to engage one another in the closed position.

17. The two-piece fiber optic adapter assembly according to claim 11, wherein the retention cap has openings to receive posts on the adapter body to secure the retention cap to the adapter body.

18. The two-piece fiber optic adapter assembly according to claim 11, wherein the first and second shutters have an outwardly extending bump to engage an inner housing of the fiber optic connector to orient the fiber optic connector within the fiber optic adapter assembly.

* * * * *